(12) United States Patent
Childers et al.

(10) Patent No.: US 12,434,307 B2
(45) Date of Patent: Oct. 7, 2025

(54) CHUCK FOR A WIRE DRIVER

(71) Applicant: Stryker Corporation, Kalamazoo, MI (US)

(72) Inventors: Robert W. Childers, Trinity, FL (US); Aman Deep Mathur, Rajasthan (IN); Ankur Bhagat, Uttarakhand (IN)

(73) Assignee: Stryker Corporation, Portage, MI (US)

( * ) Notice: Subject to any disclaimer, the term of this patent is extended or adjusted under 35 U.S.C. 154(b) by 966 days.

(21) Appl. No.: 17/282,034

(22) PCT Filed: Oct. 1, 2019

(86) PCT No.: PCT/US2019/054093
§ 371 (c)(1),
(2) Date: Jul. 18, 2022

(87) PCT Pub. No.: WO2020/072511
PCT Pub. Date: Apr. 9, 2020

(65) Prior Publication Data
US 2023/0339026 A1    Oct. 26, 2023

Related U.S. Application Data

(60) Provisional application No. 62/862,854, filed on Jun. 18, 2019, provisional application No. 62/740,579, filed on Oct. 3, 2018.

(51) Int. Cl.
*B23B 31/177* (2006.01)
*A61B 17/16* (2006.01)

(52) U.S. Cl.
CPC ...... *B23B 31/16237* (2013.01); *A61B 17/162* (2013.01); *A61B 17/1697* (2013.01);
(Continued)

(58) Field of Classification Search
CPC ......... B23B 31/16237; B23B 31/16241; Y10T 279/17119; Y10T 279/17743; Y10T 279/17683; A61B 17/162; A61B 17/1697
See application file for complete search history.

(56) References Cited

U.S. PATENT DOCUMENTS 2,546,351 A    3/1951  Stoner
3,467,403 A    9/1969  Coyle et al.
(Continued)

FOREIGN PATENT DOCUMENTS

CN    1183067 A     5/1998
CN    101676051 A   3/2010
(Continued)

OTHER PUBLICATIONS

CONMED/HALL, Images of Drilling and Reaming Attachments, May 21, 2018 or earlier, 1 page.
(Continued)

*Primary Examiner* — Eric A. Gates
(74) *Attorney, Agent, or Firm* — Howard & Howard Attorneys PLLC

(57) ABSTRACT

A chuck (10) includes a jaw guide (64), interleaving jaws (66), and an inclined engagement surface (84). The jaw guide defines a longitudinal axis (24) and includes jaw channels (65) circumferentially distributed about the axis. The jaws are slidably disposed in the jaw channels Each jaw has a clamping surface (88) facing the axis and a driving surface (90) substantially opposite the clamping surface and a protrusion (92) on a first lateral side and a cavity (96) on a second lateral side. The protrusion of each jaw is disposed at least in part in the cavity of an adjacent jaw. The engagement surface is on one of an inner surface of the jaw guide and an engagement sleeve (80), and is substantially centered about the axis and substantially parallel to the driving surface. Displacement of the jaws relative to the
(Continued)

engagement surface in a clamping direction displaces the clamping surfaces toward the axis.

10 Claims, 24 Drawing Sheets

(52) U.S. Cl.
CPC .. *B23B 31/16241* (2013.01); *Y10T 279/17119* (2015.01); *Y10T 279/17743* (2015.01)

(56) References Cited

U.S. PATENT DOCUMENTS

| | | | |
|---|---|---|---|
| 3,975,032 | A | 8/1976 | Bent et al. |
| 4,050,528 | A | 9/1977 | Foltz et al. |
| 4,067,403 | A | 1/1978 | Richmond et al. |
| 4,091,880 | A | 5/1978 | Troutner |
| 4,109,735 | A | 8/1978 | Bent |
| 4,121,848 | A | 10/1978 | Morawski |
| 4,298,074 | A | 11/1981 | Mattchen |
| 4,441,563 | A | 4/1984 | Walton, II |
| 4,594,036 | A | 6/1986 | Hogenhout |
| 4,620,539 | A | 11/1986 | Andrews et al. |
| 4,736,742 | A | 4/1988 | Alexson et al. |
| 5,387,217 | A | 2/1995 | Sefcik et al. |
| 5,476,467 | A | 12/1995 | Benoist |
| 5,496,327 | A | 3/1996 | Den Ouden et al. |
| 5,794,715 | A | 8/1998 | Norman |
| 5,857,681 | A | 1/1999 | Carter |
| 5,902,306 | A | 5/1999 | Norman |
| 6,042,585 | A | 3/2000 | Norman |
| 6,428,018 | B1 | 8/2002 | Aultman et al. |
| 6,673,078 | B1 | 1/2004 | Muncie |
| 8,425,521 | B2 | 4/2013 | Cremer et al. |
| 9,095,911 | B2 | 8/2015 | Helm |
| 9,333,019 | B2 | 5/2016 | Khosla et al. |
| 9,585,676 | B1 | 3/2017 | Russo et al. |
| 9,662,713 | B2 | 5/2017 | Young et al. |
| 2002/0163140 | A1 | 11/2002 | Grogan et al. |
| 2014/0276890 | A1* | 9/2014 | Khosla ........... A61B 17/162 606/103 |
| 2020/0038040 | A1 | 2/2020 | Mahaffey |

FOREIGN PATENT DOCUMENTS

| | | |
|---|---|---|
| CN | 201880944 U | 6/2011 |
| CN | 102233444 A | 11/2011 |
| CN | 102785229 A | 11/2012 |
| CN | 103648727 A | 3/2014 |
| DE | 20021136 U1 | 3/2001 |
| DE | 102006053482 B4 | 6/2012 |
| EP | 0059030 B1 | 11/1986 |
| EP | 0225449 A2 | 6/1987 |
| EP | 2777552 A1 | 9/2014 |
| FR | 3009798 A1 | 2/2015 |
| JP | S57156106 A | 9/1982 |
| JP | S59232704 A | 12/1984 |
| JP | 2000334611 A | 12/2000 |
| WO | 2018106445 A1 | 6/2018 |

OTHER PUBLICATIONS

English language abstract and machine-assisted English translation for DE 10 2006 053 482 B4 extracted from espacenet.com database on Apr. 1, 2021, 7 pages.
International Search Report for Application No. PCT/US2019/054093 dated Jan. 16, 2020, 2 pages.
Machine-assisted English translation for DE 200 21 136 U1 extracted from espacenet.com database on Apr. 1, 2021, 6 pages.
Stryker, Images of Drilling and Reaming Attachments, May 21, 2018 or earlier, 1 page.
Synthes Power Tools, "Battery Power Line. Battery-Driven Power Tool System for Orthopaedis and Traumatology User's Manual", 2004, 56 pages.
Synthes Power Tools, Images of Drilling and Reaming Attachments, May 21, 2018 or earlier, 1 page.
English language abstract and machine-assisted English translation for CN 102785229 A extracted from espacenet. com database on Jun. 24, 2024, 10 pages.
English language abstract and machine-assisted English translation for EP 0 225 449 A2 extracted from espacenet. com database on Jun. 24, 2024, 5 pages.
English language abstract for CN 1183067 A extracted from espacenet.com database on Mar. 4, 2024, 2 pages.
English language abstract for CN 101676051 A extracted from espacenet.com database on Mar. 4, 2024, 2 pages.
English language abstract and machine-assisted English translation for CN 201880944 U extracted from espacenet. com database on Mar. 4, 2024, 9 pages.
English language abstract and machine-assisted English translation for CN 103648727 A extracted from espacenet. com database on Mar. 4, 2024, 10 pages.
English language abstract and machine-assisted English translation for FR 3009798 A1 extracted from espacenet.com database on Mar. 4, 2024, 10 pages.
English language abstract for JPS 57-156106 A extracted from espacenet. com database on Nov. 21, 2023, 1 page.
English language abstract for JPS 59-232704 A extracted from espacenet. com database on Nov. 21, 2023, 1 page.
English language abstract for CN 102233444 A extracted from espacenet.com database on Jan. 9, 2025, 1 page.
English language abstract for JP 2000-334611 A extracted from espacenet.com database on Aug. 5, 2025, 2 pages.

* cited by examiner

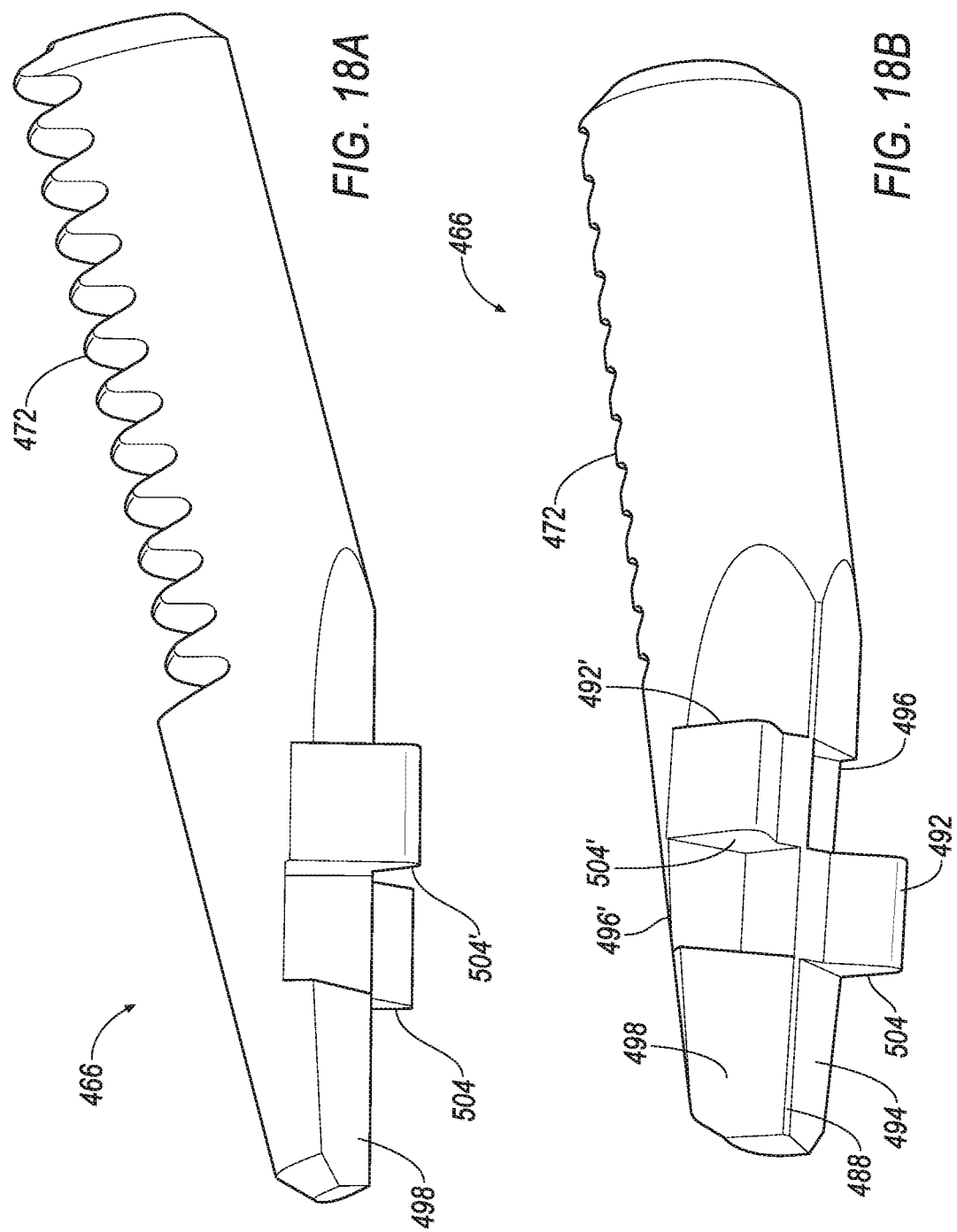

CHUCK FOR A WIRE DRIVER

RELATED APPLICATIONS

This patent application claims priority to and all the benefits of International Application No. PCT/US2019/054093 which claims priority to and all the benefits of both U.S. Provisional Patent Application No. 62/862,854 filed on Jun. 18, 2019 and U.S. Provisional Patent Application No. 62/740,579 filed on Oct. 3, 2018, which are herein incorporated by reference in their entireties.

BACKGROUND

Inserting and clamping a shaft, e.g., a wire, a pin, a drill bit, into a 3-jaw chuck so that it is centered on an axis of rotation and firmly clamped in the chuck can be difficult, particularly when the chuck is used to selectively clamp and release and clamp the shaft. Shafts at a low end of a chuck's diametral range may be unintentionally inserted and clamped off-center, or at an angle to the axis of rotation.

BRIEF DESCRIPTION OF THE DRAWINGS

FIG. 18A is a bottom-right-front perspective view, primarily from the right-side of a jaw of FIGS. 16 and 17.

FIG. 18B is a bottom-right-front perspective view, primarily from the bottom of the jaw of FIG. 18A.

DETAILED DESCRIPTION

Figure 1:
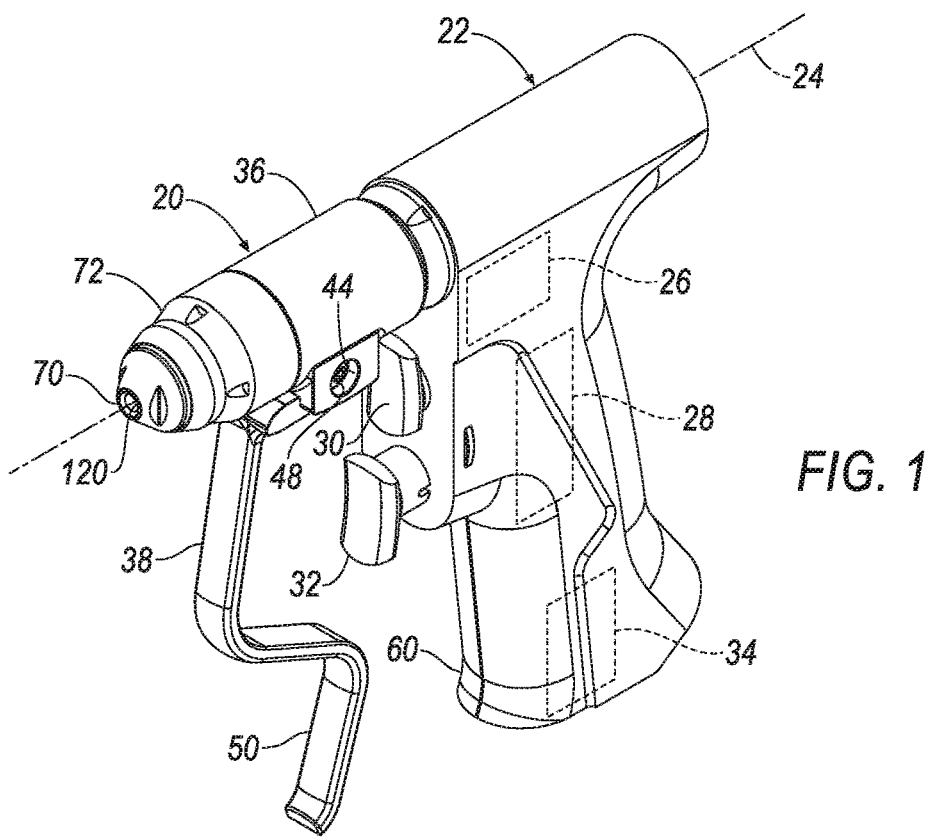
FIG. 1 is a top-front-right perspective view of an example chuck coupled to an example handpiece.

The prior art did not address the need to quickly and easily insert and clamp a shaft in a jaw chuck as may be needed for use during surgical procedures.

An example chuck includes a jaw guide, a plurality of interleaving jaws, and an inclined engagement surface. The jaw guide defines a longitudinal axis and includes jaw channels circumferentially distributed about the axis. The jaws are slidably disposed in the jaw channels. Each jaw has a clamping surface facing the axis and a driving surface substantially opposite the clamping surface and a protrusion on a first lateral side and a cavity on a second lateral side. The protrusion of each jaw is disposed at least in part in the cavity of an adjacent jaw. The engagement surface is on one of an inner surface of the jaw guide and an engagement sleeve, and is substantially centered about the axis and substantially parallel to the driving surface. Displacement of the jaws relative to the engagement surface in a clamping direction displaces the clamping surfaces toward the axis.

A chuck for a wire driver comprises an axially extending jaw guide, a plurality of interleaving jaws, and an engagement sleeve. The axially extending jaw guide defines a longitudinal axis and includes a first plurality of jaw channels circumferentially distributed about the axis. The plurality of interleaving jaws is slidably disposed in the jaw channels. Each jaw has a clamping surface facing the axis and a driving surface substantially opposite the clamping surface and a protrusion on a first lateral side and a cavity on a second lateral side. The protrusion of each jaw is disposed at least in part in the cavity of an adjacent jaw. The engagement sleeve has an inclined engagement surface on an inner surface thereof. The engagement surface is substantially centered about the axis and is substantially parallel to the driving surface. Displacement of the jaw guide relative to the engagement sleeve in a clamping direction displaces the clamping surfaces toward the axis.

Such chucks may comprise additional features as set forth below, such features being included separately or in combination with each other, with such combinations being limited only by mutual exclusivity.

The jaws may define a receiving aperture accommodating receipt and clamping of shafts ranging from a first diameter to a larger second diameter with the protrusions being disposed in the cavities when the jaws are positioned to clamp shafts of the first diameter.

The channels and the jaws may be evenly distributed about the axis and the protrusion of each jaw is substantially complementary to the cavity in the adjacent jaw.

The jaws may have each of a protrusion and a cavity on each of the first lateral side and the second lateral side and the protrusion of the first lateral side of each jaw may be disposed at least in part in the cavity of the second lateral side of an adjacent jaw. The protrusion of the second lateral side of each jaw may be disposed at least in part in the cavity of the first lateral side of the adjacent jaw.

The jaws and the protrusions may each have a sloped distal surface that is shorter at the clamping surface.

The jaws and the protrusions each may have a sloped proximal surface that is shorter at the clamping surface.

The jaws and the protrusions may each have a sloped distal surface that is shorter at the clamping surface and have a sloped proximal surface that is shorter at the clamping surface.

The protrusions may extend into a gap between facing lateral sides of adjacent jaws proximate to the clamping surfaces.

The protrusions may extend towards the axis beyond the clamping surface.

A chuck may further comprise a substantially cylindrical housing and a clamping lever. The jaw guide, the jaws, and the engagement sleeve may be rotatably disposed inside the substantially cylindrical housing. The clamping lever may be pivotably mounted to the housing and connected to one of the jaw guide and the engagement sleeve for axial displacement thereof.

The chuck may have a ratio of a largest shaft to a smallest that can be accommodated by the chuck without pinching substantially equal to 4:1.

The chuck may further comprise a substantially cylindrical housing and a clamping lever. The jaw guide, the jaws, and the engagement sleeve may be rotatably disposed inside the substantially cylindrical housing. The clamping lever may be pivotably mounted to the housing and connected to one of the jaw guide and the engagement sleeve for axial displacement of the engagement sleeve.

The inclined engagement surface may be on the engagement sleeve. The jaw guide may be substantially fixed relative to the engagement sleeve. The chuck may further comprise an axially displaceable actuation head in axial engagement with the jaws. Axial displacement of the actuation head in an engagement direction may push the driving surfaces of the jaws against the inclined engagement surface and axially displace the jaws relative to the engagement sleeve.

The inclined engagement surface may be on the jaw guide. The jaws may have threaded surfaces disposed thereon in threaded engagement with threads disposed on the sleeve.

The jaw guide may be at a distal end of the drive shaft.

A chuck for a wire driver comprises a substantially cylindrical housing, an axially extending drive shaft, a plurality of jaws, an engagement sleeve, an actuator sleeve, a first positioning bearing, a second positioning bearing and a clamping actuator. The substantially cylindrical housing defines a longitudinal axis. The axially extending drive shaft is rotatably disposed within the housing on the longitudinal axis for selective rotation thereabout. The drive shaft includes a jaw guide at a distal end of the drive shaft. The jaw guide includes a first plurality of jaw channels circumferentially distributed about the axis. The plurality of jaws is slidably disposed in the jaw channels. Each jaw has a clamping surface facing the axis and a driving surface substantially opposite the clamping surface. An engagement sleeve is rotatably disposed within the housing on the longitudinal axis for selective rotation thereabout. The engagement sleeve has an inclined engagement surface on an inner surface thereof. The engagement surface is substantially centered about the axis and is substantially parallel to the driving surface. The engagement surface is disposed at least in part in axial alignment with and radially outward of the driving surface and is in selective engagement with the driving surface. The actuator sleeve is slidably and non-rotatably disposed on the longitudinal axis proximal to the engagement surface and in selective axial engagement with the engagement sleeve in each of a first axial direction and a second axial direction. The first positioning bearing is an axial-radial load bearing disposed between the drive shaft and the housing proximal to the actuator sleeve. The second positioning bearing is a substantially radial-only load bearing disposed between the engagement sleeve and the housing distal to the actuator sleeve. The clamping actuator is connected to the actuator sleeve by a clamping linkage for axial displacement of the engagement sleeve. Displacement of the engagement sleeve relative to the jaw guide in a clamping direction displaces the clamping surfaces toward the axis.

The chuck of the preceding paragraph may comprise additional features as set forth below, such features being included separately or in combination with each other, with such combinations being limited only by mutual exclusivity.

The chuck may further include a bearing support sleeve disposed on and fixed to the drive shaft with an inner race of the first positioning bearing fixed thereto.

The bearing support sleeve may include threads on an inside diameter thereof and a first shoulder on the inside diameter on a proximal end of the threads. The drive shaft may include threads on a tail portion of the drive shaft and a second shoulder on an outside diameter of the drive shaft on a proximal end of the threads. The threads of the bearing support sleeve may be in threaded engagement with the threads of the tail portion and the respective shoulders may be in engagement with each other.

The clamping actuator may comprise a clamping lever pivotably mounted to the housing. The clamping linkage may comprise a yoke portion of the lever in engagement with the actuator sleeve. Displacement of the engagement sleeve relative to the jaw guide in a clamping direction may displace the clamping surfaces toward the axis.

A first thrust bearing may be disposed between a distal end of the actuator sleeve and the engagement sleeve. A second thrust bearing may be disposed between a proximal end of the actuator sleeve and the engagement sleeve.

Relative orientations and directions (by way of example, upper, lower, bottom, rearward, front, rear, back, outboard, inboard, inward, outward, lateral, left, right, proximally, distally) are set forth in this description not as limitations, but for the convenience of the reader in picturing at least one embodiment of the structures described. Here, "proximally" is understood to mean towards the surgeon holding a handpiece 22, away from the surgical site to which a wire 101 or drill bit may be applied. "Distally" is understood to mean away from the surgeon and towards the site to which the wire 101 or drill bit is applied.

Figure 2:
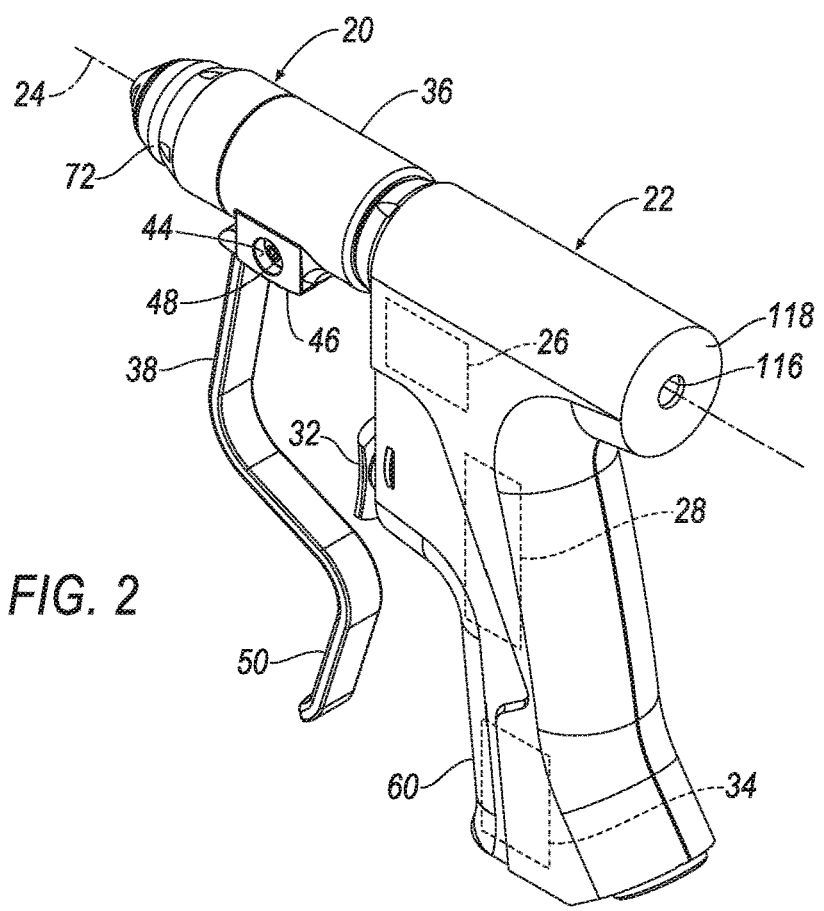
FIG. 2 is a top-rear-right perspective view of the chuck and handpiece of FIG. 1.
Figure 3:
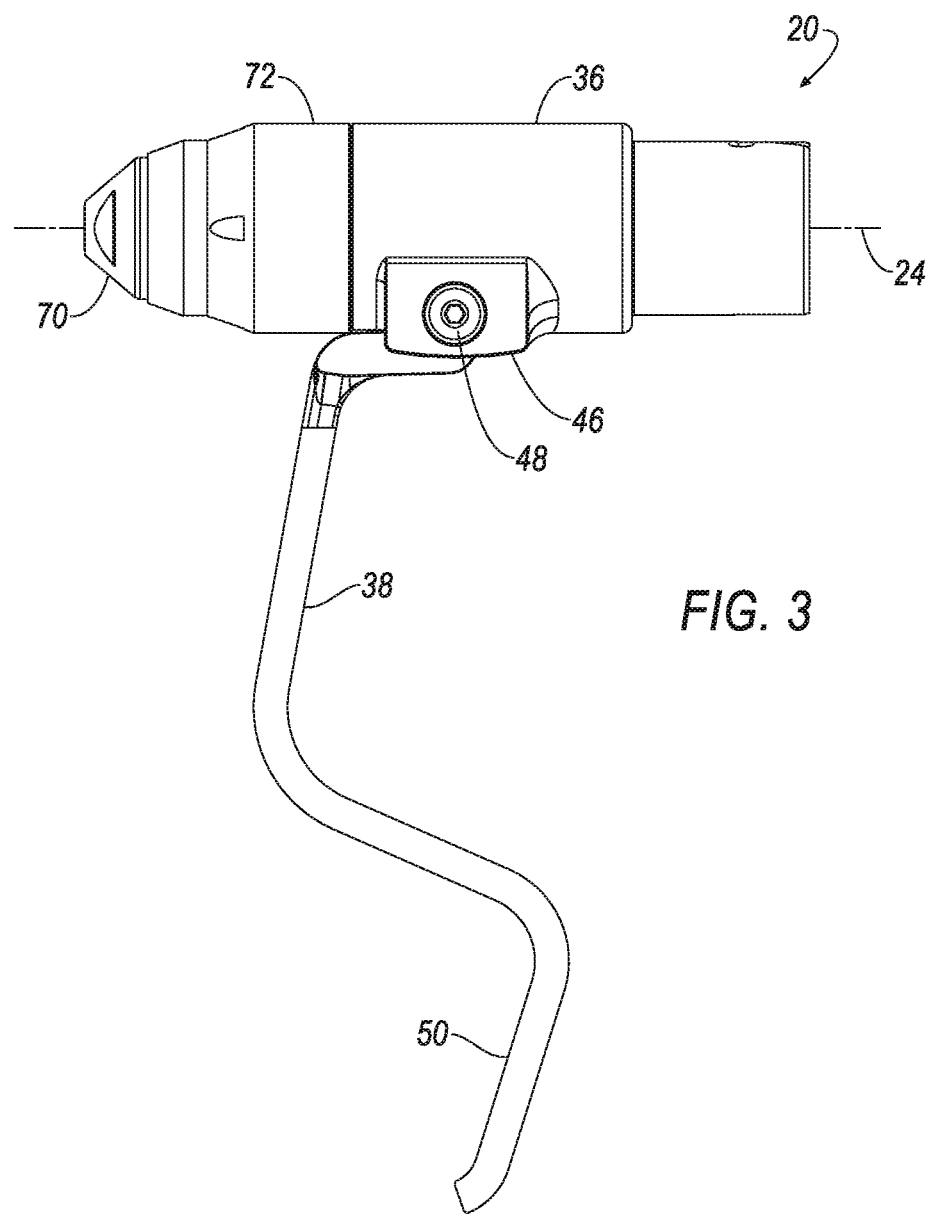
FIG. 3 is a right-side view of the example chuck of FIG. 1.
Figure 4:
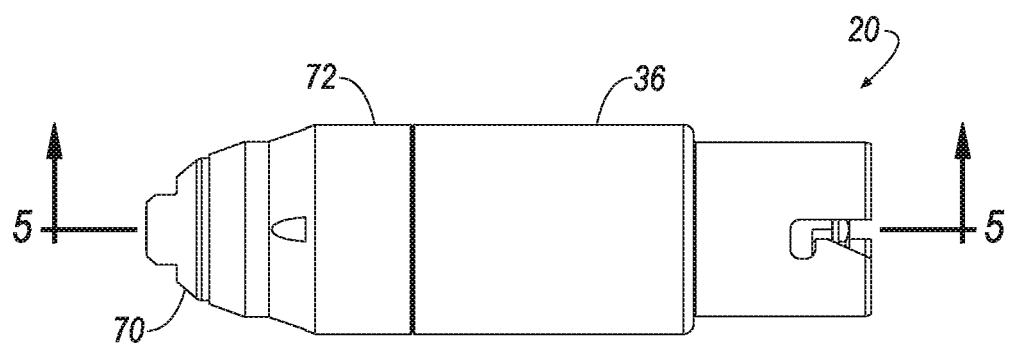
FIG. 4 is a top view of the example chuck of FIG. 1.

FIGS. 1 and 2 illustrate an example chuck 20 coupled to an example handpiece 22 that may collectively comprise a wire driver. The chuck 20 includes a longitudinal axis 24 coincident with an axis of rotation of certain parts of the chuck 20 and the handpiece 22.

The handpiece 22 may include a motor 26, a controller 28, a first actuator button 30, a second actuator button 32 and a power source 34, consistent with commercially available handpieces, e.g., the Stryker® RemB® U Driver. The power source 34 is schematically represented with example types of power sources including a battery and a power cord. The identified power sources are not intended to be limiting. Examples of yet additional alternative sources of power include pneumatic power and hydraulic power.

The example chuck 20, best illustrated in FIGS. 3 through 6, is substantially oriented along the longitudinal axis 24. The longitudinal axis 24 may also serve as an axis of rotation for the chuck 20. The chuck 20 includes a chuck housing 36 in which rotatable parts may be disposed. The housing 36 may be substantially cylindrical in shape and centered on the axis 24 and may define the axis 24.

The chuck 20 may further include an example clamping actuator, e.g., a clamping lever 38, which may be pivotably connected to the housing 36 by a pivot axle, i.e., a pin 40 passing through a lever pivot aperture 42 in the lever 38 and associated lever mounting apertures 44 in a mounting trunnion 46 of the housing 36. Screws 48 may be used to retain the pin 40 in the lever 38 and the trunnion 46. A grip portion 50 may be separated from a yoke portion 52 of the lever 38 by the pivot aperture 42.

The yoke portion 52 may be substantially disposed within the housing 36, passing through an opening 54 in the housing 36 aligned with the trunnion 46. The yoke portion 52 is slidably disposed in an actuator slot 56 of an actuator sleeve 58, thus connected with the actuator sleeve 58. The actuator sleeve 58 is slidably disposed within the housing 36 for movement along the axis 24. The engagement of the yoke portion 52 with the sleeve 58 causes axial movement of the sleeve 58 along the axis 24 with pivoting of the lever 38 about the pin 40. A release spring 59, e.g., a compression coil spring, may be disposed in the housing 36 between the housing and the sleeve 58 to bias the sleeve 58 to a released position, and with it, the lever 38 to a released position away from a grip handle 60 of the handpiece 22.

A clamping linkage between the lever 38 and more particularly the grip portion 50 and the actuator sleeve 58 may include the yoke portion 52, the trunnion 46 and the actuator slot 56. An alternative arrangement may include an actuator in the form of an electric drive motor and a switch therefor in place of the lever, and a clamping linkage in the form of a gear drive disposed between the drive motor and the actuator sleeve 58.

A drive shaft 62 is rotatably disposed within the housing 36 and on the longitudinal axis 24 for selective rotation thereabout. The drive shaft 62 may compromise a jaw guide 64 for unitary rotation therewith. The jaw guide 64 is axially extending in that it extends axially along the axis 24 and may define the axis 24 and may be at a distal end of the drive shaft 62. The jaw guide 64 includes a plurality of jaw channels 65, three being an example number, in which jaws 66 are slidably disposed. The channels 65 are circumferentially evenly distributed around the axis 24, e.g., the channels being separated by 120° with three channels 65. The drive shaft 62 may include an engagement end 68 for coupling with a rotative drive element (not shown) driven by the motor 26 of the handpiece 22. A first positioning bearing 67, e.g., a roller bearing 67, may be placed between the drive shaft 62 and the housing 36 to facilitate rotation therebetween. The bearing 67 is schematically illustrated as an annular ring with a solid cross-section for the purpose of showing the space that may be occupied by the bearing 67. However, the bearing 67 may include rollers (e.g., ball rollers, cylindrical rollers, tapered roller, needle rollers), an inner race, an outer race and a roller cage. The bearing 67 may be an axial-radial load bearing, i.e., able to sustain and accommodate both thrust loads, i.e., axial loads, and radial loads.

The first positioning bearing 67 may be mounted on a bearing support sleeve 69 fixed to the shaft 62. The bearing support sleeve 69 may have first threads 71 on an inside diameter in threaded engagement with the drive shaft 62 which may have second threads 73 on an outside diameter. Relative positioning of the sleeve 69 and the shaft 62 may be established by engagement of an internal diameter first shoulder 75 in the sleeve 69 engaging an outer diameter second shoulder 77 of the drive shaft 62. The shoulders 75, 77 may be parallel, and each may have an angle of 45°. Such an arrangement may, when the sleeve 69 is installed, induce a tensile load the sleeve 69 and a compressive load in the drive shaft 62 between the respective threads 71, 73 and shoulders 75, 77.

A distal end of the drive shaft 62 may have a nose cap 70 disposed thereon for rotation therewith. The nose cap 70 may aid in retaining a leaf spring disposed between the nose cap 70 and the jaw guide 64. The nose cap 70 may be surrounded in part by a nose housing 72 that is fixed to a distal end of the drive shaft 62 by a threaded engagement therebetween.

The leaf spring 74 may be employed to aid in retaining the jaws 66 in the jaw channels 65. The leaf spring 74 may include a plurality of spring fingers 76, equal in number to the number of jaws 66, to engage each of the jaws 66. The fingers 76 may each extend from a circular base 78.

Figure 5A:
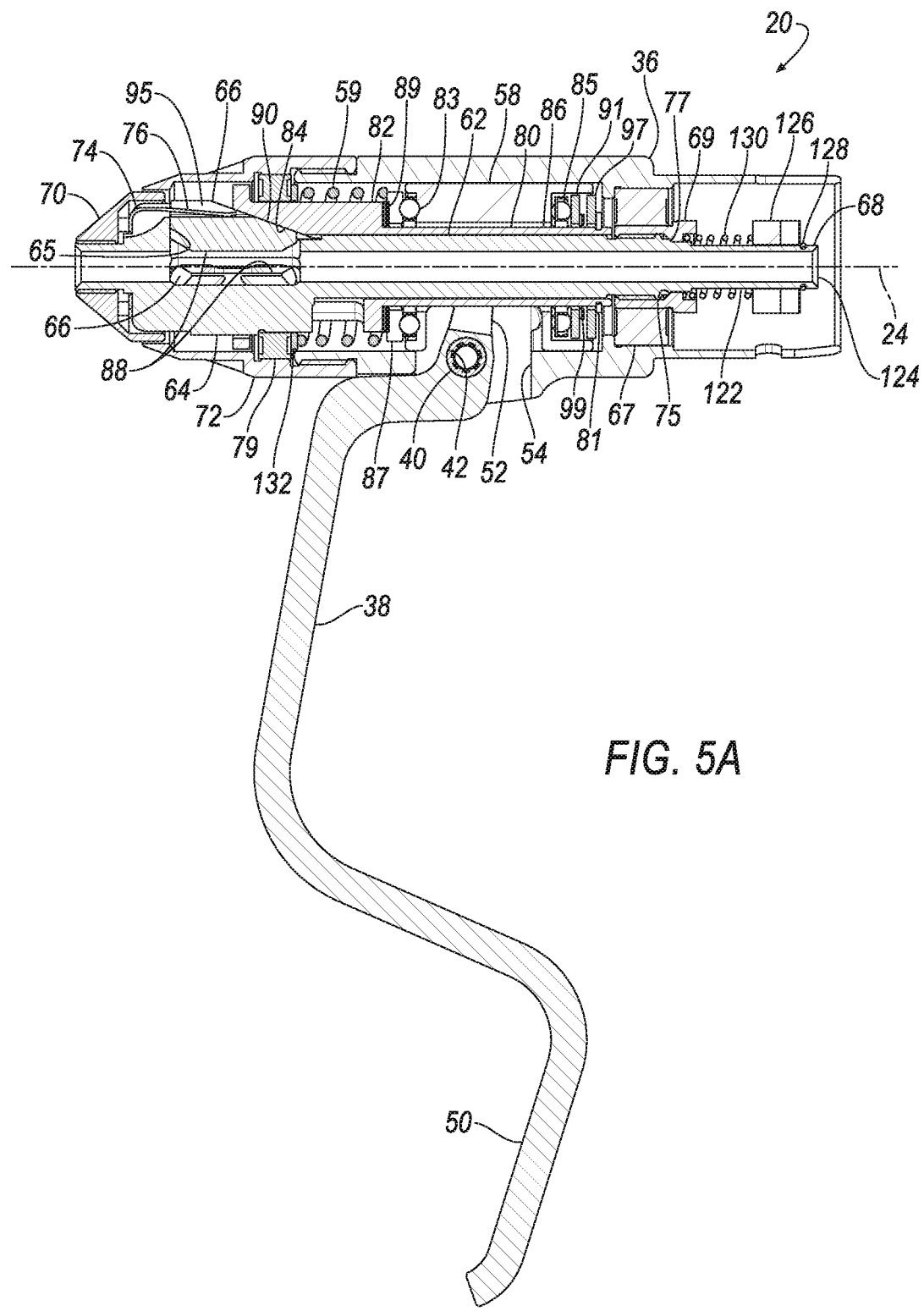
FIG. 5A is a sectional view of the chuck of FIG. 4 taken in the direction of arrows 5.
Figure 5B:
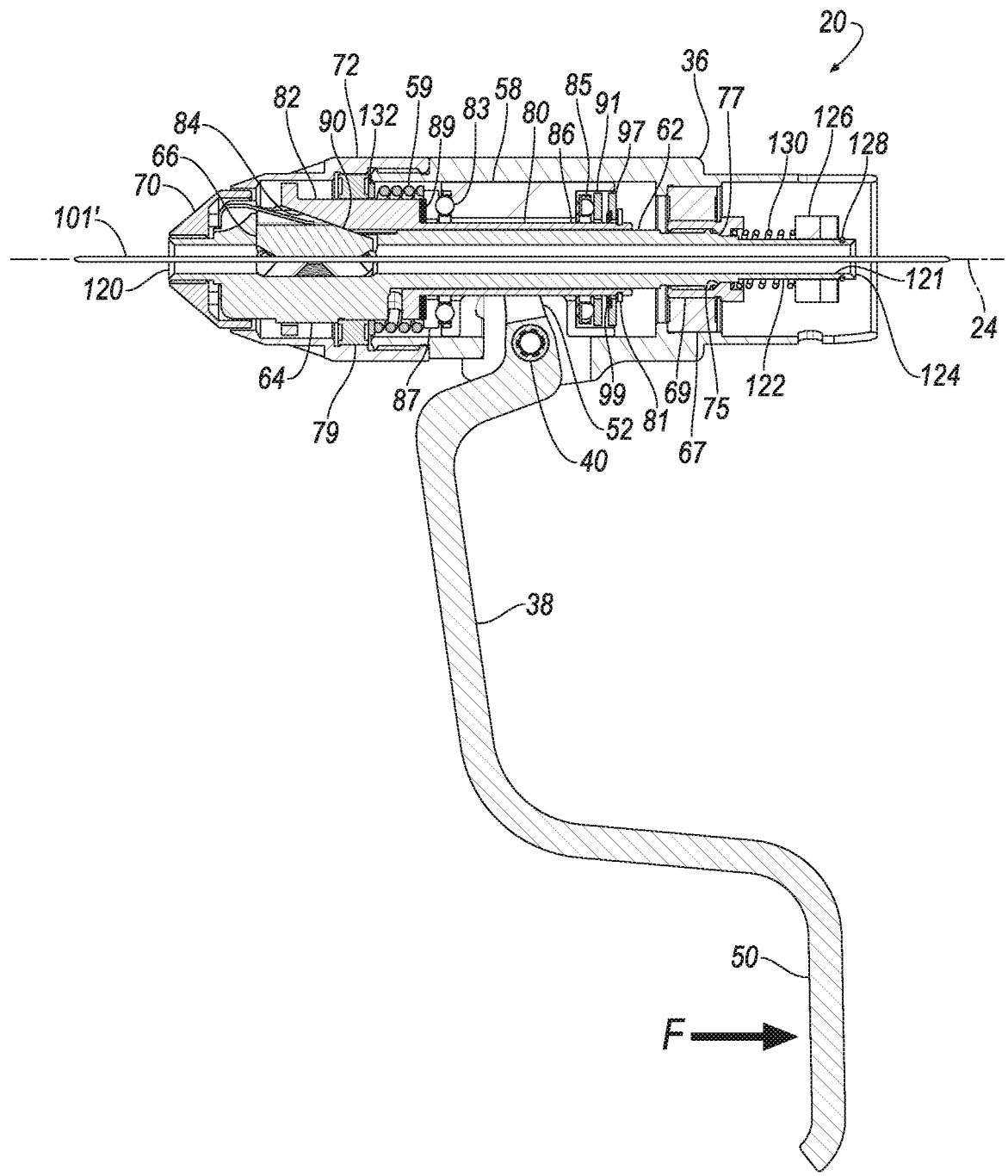
FIG. 5B is the sectional view of the chuck of FIG. 5A with a first shaft therein.

An engagement sleeve 80 includes a head portion 82 with an inclined engagement surface 84 on an inner surface of the engagement sleeve 80. The inclined engagement surface 84 is disposed at least in part in axial alignment with and radially outward of the jaws 66, at least partially enclosing the jaws 66 in an engaged position as best shown in FIG. 5B. The engagement surface 84 may be in selective engagement with the driving surface 90. The engagement sleeve 80 may include a tail portion 86 that extends axially away from the head portion 82 in a proximal direction and helps maintain the head portion 82 centered on the axis 24. A second positioning bearing 79, e.g., a roller bearing 79, may be disposed between the engagement sleeve 80 and the housing 36. More specifically, an inner race (not shown) of the bearing 79 may be in engagement with the head portion 82. An outer race (not shown) of the bearing 79 may be in engagement with the nose housing 72 which, as noted above, is fixed to the housing 36. Rollers and a roller cage (not shown) may be disposed between the races of the bearing 79. The bearing 79 may be configured to accommodate substantially radial-only loads.

The actuator sleeve 58 may be slidably disposed on the tail portion 86 for axial movement therealong and relative rotation therebetween. Axial movement of the sleeve 58 along the tail portion 86 in a proximal direction may be limited by a first retaining ring 81 that may be removably disposed on a proximal end of the tail portion 86. Axial movement of the sleeve 58 along the tail portion 86 in the distal direction may be limited by the head portion 82 of the engagement sleeve 80. The actuator sleeve 58 may be in First and second thrust bearings 83, 85, e.g., roller bearings 83, 85, may be disposed at opposite ends of the actuator sleeve 58 to reduce frictional resistance against relative rotation of the engagement sleeve 80 to the actuator sleeve 58, particularly when the actuator sleeve 58 is biased to either an extreme proximal or distal position on the tail portion 86.

The actuator sleeve 58 may be in selective axial engagement with the head portion 82 of the engagement sleeve 58 when the actuator sleeve 58 is disposed in a first axial direction, e.g., the distal direction, such engagement including indirect engagement as may occur with a first thrust plate 87 and the thrust bearing 83 intermediate between the actuator sleeve 58 and the head portion 82. Similarly, the actuator sleeve 58 may be in selective axial engagement with the proximal end of the tail portion 86 indirectly through the retaining ring 81 when the actuator sleeve 58 is disposed in a second direction, e.g., a proximal direction, such engagement including engagement as may occur with a second thrust plate 91 and a thrust bearing 85 intermediate between the actuator sleeve 58 and the retaining ring 81.

The first thrust bearing 83 that may include rollers and a roller cage may be disposed between the head portion 82 and the actuator sleeve 58. The first thrust plate 87 may be disposed between the thrust bearing 83 and the head portion 82. Each of the thrust plate 87 and the head portion 82 may define opposed bearing races. A plurality of shim washers 89, collectively a shim stack, may be disposed between the first thrust plate 87 and the head portion 82. Another thrust plate, not sown, may be disposed between the head portion 82 and the bearing 83. Yet alternatively, the bearing 87 may include integral opposed bearing races, eliminating the need to form races in the head portion 82 or the thrust plate 87.

The second thrust bearing 85 may be disposed over the tail portion 86 between the actuator sleeve 58 and the first retaining ring 81. The tail portion 86 of the engagement sleeve 80 may carry the second thrust plate 91 between the second thrust bearing 85 and the first retaining ring 81. The second thrust plate 91 may be diametrally sized for axial engagement by the second thrust bearing 85 and retention by the ring 81. The alternative bearing structures described for the first thrust bearing 87 may be employed here as well. A third thrust plate 97 may be disposed between the second thrust bearing 85 and the second thrust plate 91. A spring washer 99 may be disposed between the thrust plates 91, 97. The drive shaft 62 may have a proximal portion 122 terminating at a proximal end 124 of the drive shaft 62. An input shaft guide 126 may be slidably disposed over the proximal portion 122. The input shaft guide 126 and the proximal portion 122 may include complementary features, with an axial passage through the guide 126 having a sectional profile complementary to a sectional profile of the proximal portion 122. Such a profile may include features allowing the guide to axially translate along the proximal portion 122 while resisting relative rotation between the input shaft guide 126 and the drive shaft 62 and may be a substantially constant axially extending non-circular section, e.g., opposed flats, splines, and similar configurations. A second retaining ring 128, e.g., a snap ring 128, may be disposed in a circumferential groove in the proximal portion 122 near the proximal end 124. A drive spring 130, e.g., a compression coil spring 130, may be disposed over the proximal portion 122 between the bearing support sleeve 69 and the input shaft guide 126. The drive spring 130 may be in engagement with each of the bearing support sleeve 69 and the input shaft guide 126, pressing the input shaft guide 126 against the second retaining ring 128. The input shaft guide 126 may be used to drivingly connect the drive shaft 62 with an input shaft (not shown) of the handpiece 22. The input shaft may be disposed between and drivingly connect the motor 26 and the drive shaft 62 when the chuck 20 is mounted to the handpiece 22.

The jaws 66 each have a clamping surface 88 facing the axis 24, and a driving surface 90 substantially opposite the clamping surface 88. The jaws 66 further have a protrusion 92 on a first lateral side 94, and a cavity 96 in a second lateral side 98. The jaws may have a spring slot 95 that intersects the driving surface for receipt of one of the fingers 76 of the leaf spring 74.

Figure 8B:
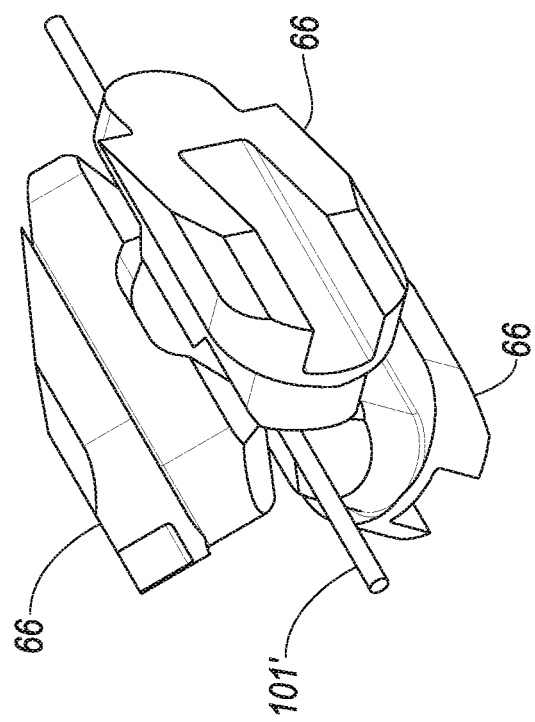
FIG. 8B is a top-right-front perspective view of three of the chuck jaws of FIG. 8A in the pre-clamping position relative to the example small-diameter shaft.
Figure 8A:
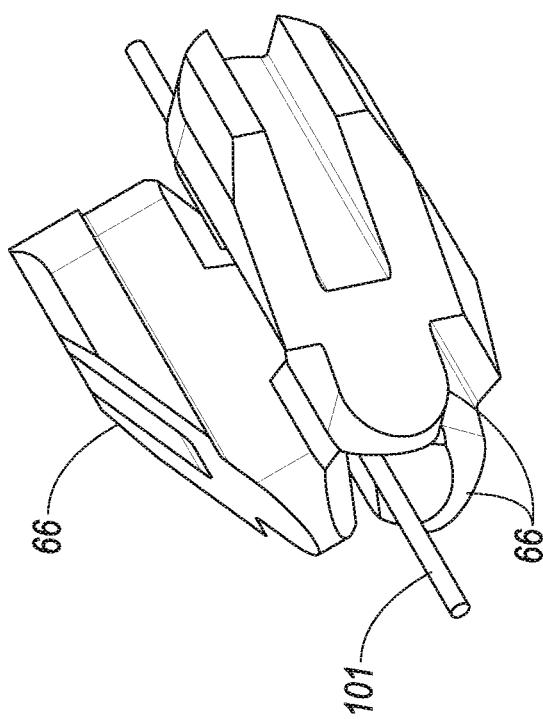
FIG. 8A is a top-left-rear perspective view of three of the chuck jaws of FIG. 7A-7C in a pre-clamping position relative to an example small-diameter shaft.
Figure 8C:
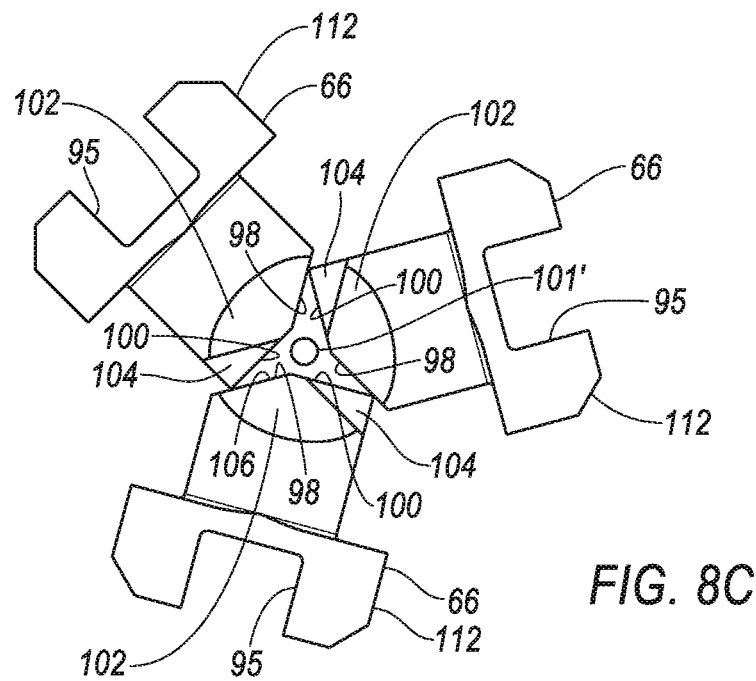
FIG. 8C is a front view of the chuck jaws of FIG. 8A in the pre-clamping position relative to the example small-diameter shaft.
Figure 8D:
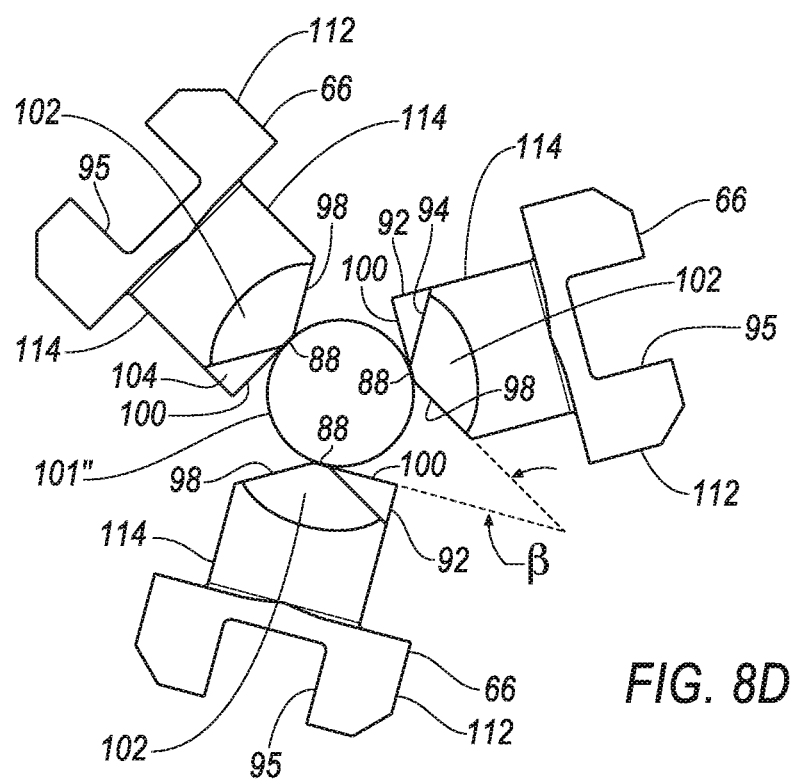
FIG. 8D is a front view of the chuck jaws of FIG. 8A in a clamping position relative to an example large-diameter shaft.
Figure 9A:
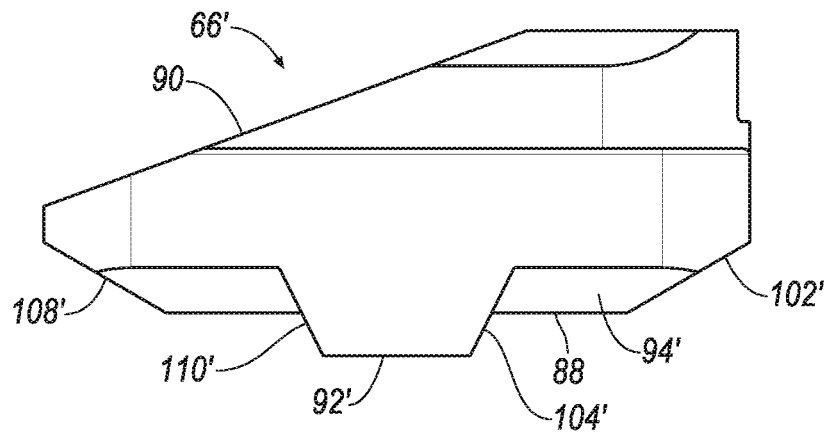
FIG. 9A is a left-side view of a second example chuck jaw of the chuck of FIGS. 1-6.
Figure 9B:
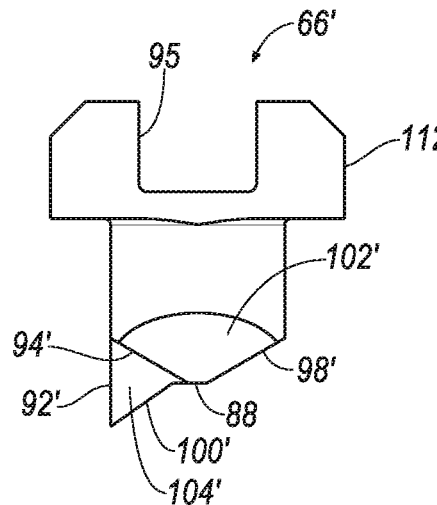
FIG. 9B is a front view of the chuck jaw of FIG. 9A.
Figure 9C:
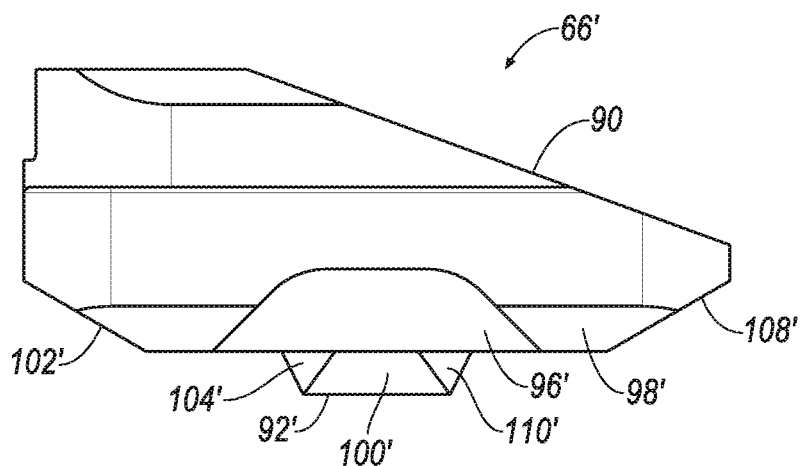
FIG. 9C is a right-side view of the chuck jaw of FIG. 9A.
Figure 10A:
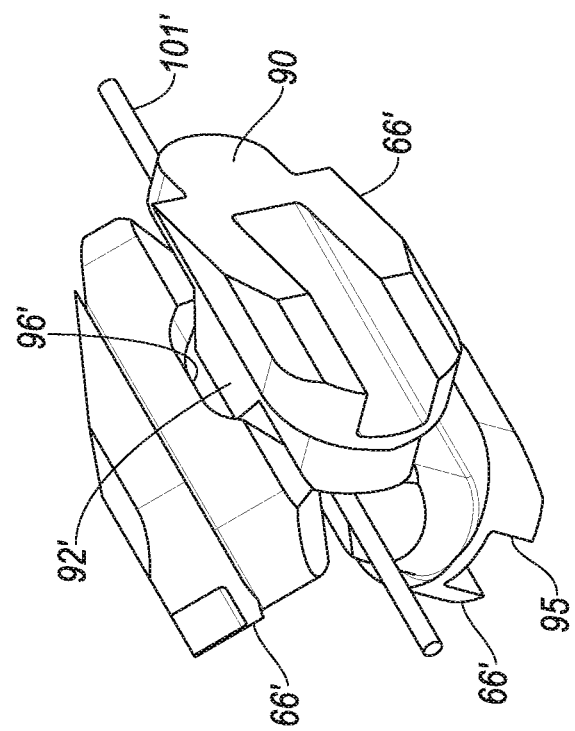
FIG. 10A is a top-left-rear perspective view of three of the chuck jaws of FIG. 9A in a pre-clamping position relative to an example small-diameter shaft.
Figure 10B:
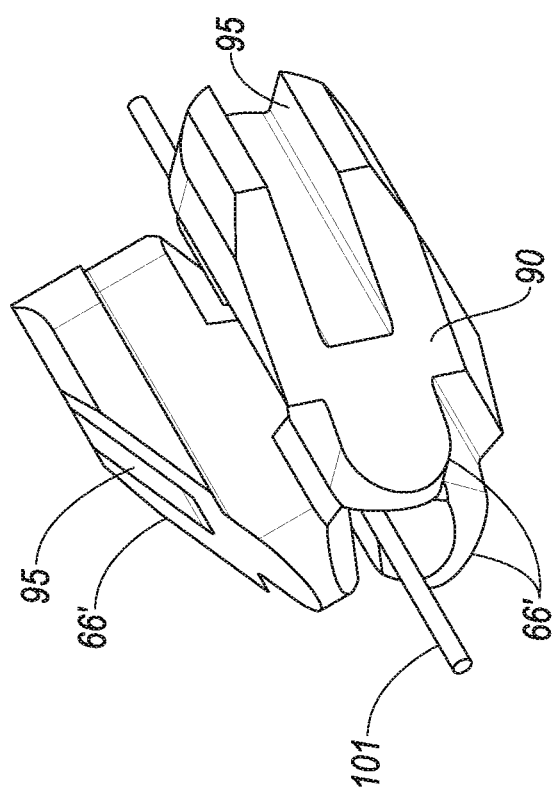
FIG. 10B is a top-right-front perspective view of three of the chuck jaws of FIG. 10A in the pre-clamping position relative to the example small-diameter shaft.
Figure 10C:
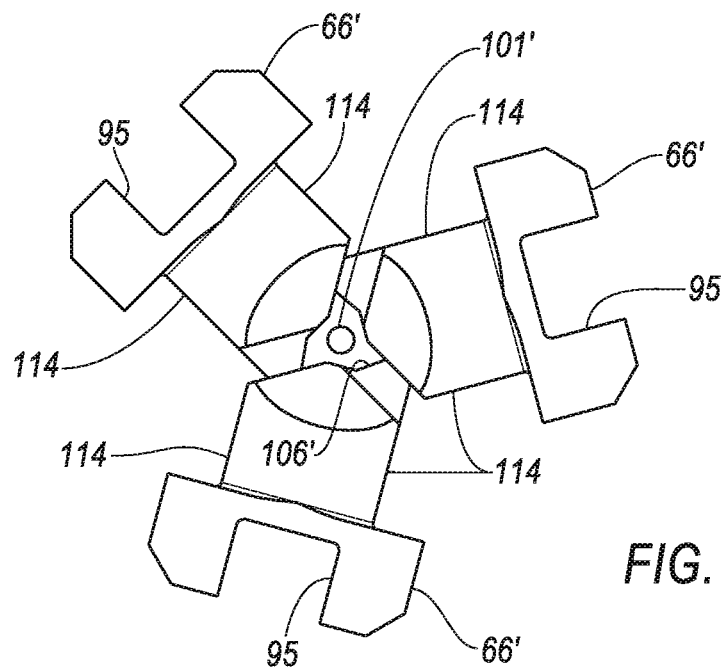
FIG. 10C is a front view of the chuck jaws of FIG. 10A in the pre-clamping position relative to the example small-diameter shaft.
Figure 10D:
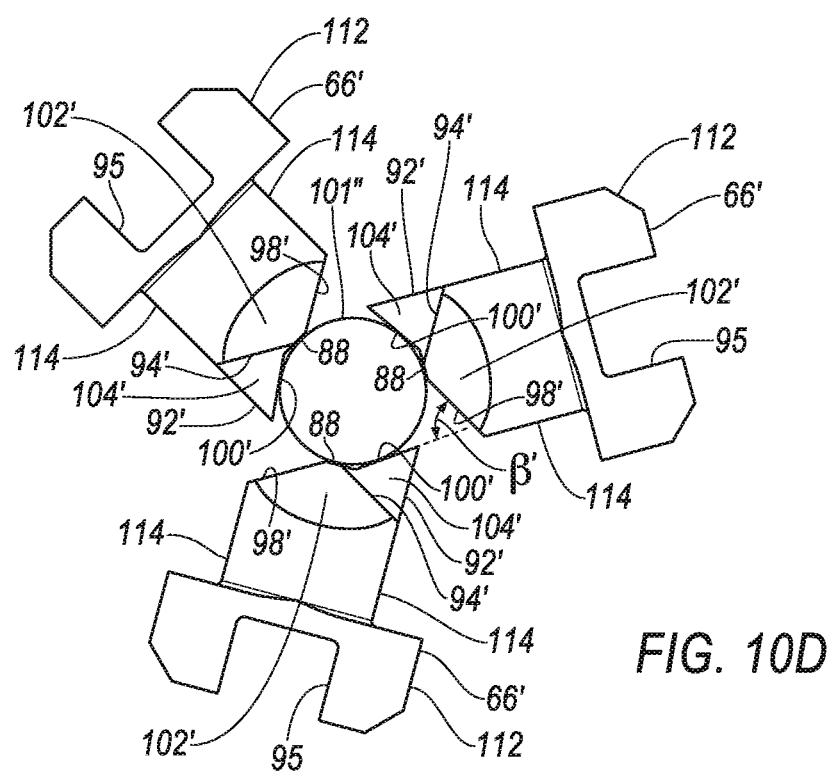
FIG. 10D is a front view of the chuck jaws of FIG. 10A in a clamping position relative to an example large-diameter shaft.
Figure 11A:
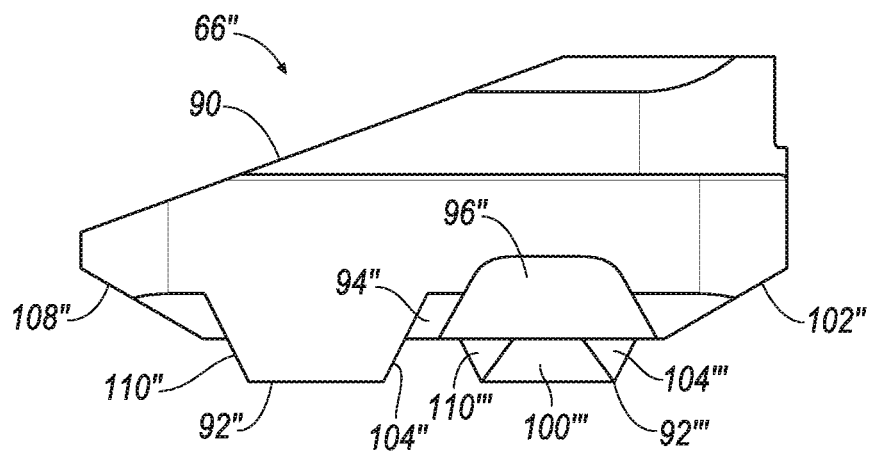
FIG. 11A is a left-side view of a third example chuck jaw of the chuck of FIGS. 1-6.
Figure 11B:
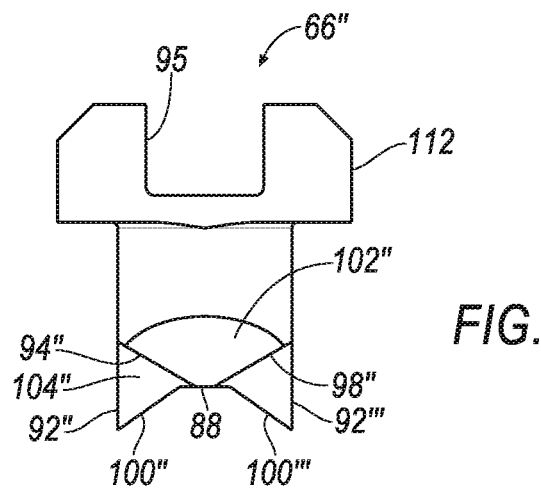
FIG. 11B is a front view of the chuck jaw of FIG. 11A.
Figure 11C:
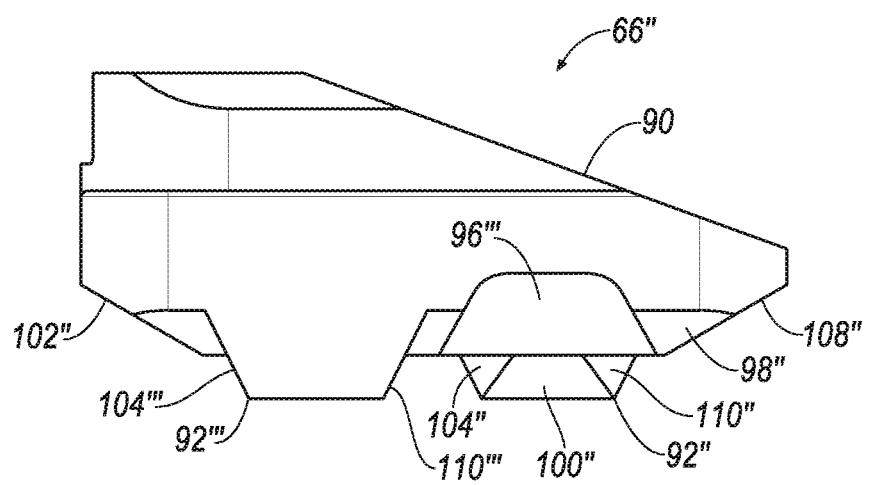
FIG. 11C is a right-side view of the chuck jaw of FIG. 11A.
Figure 12B:
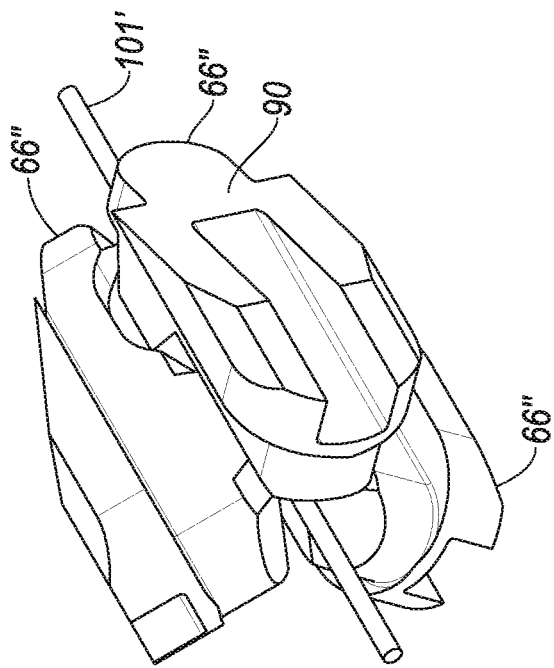
FIG. 12B is a top-right-front perspective view of three of the chuck jaws of FIG. 12A in the pre-clamping position relative to the example small-diameter shaft.
Figure 12A:
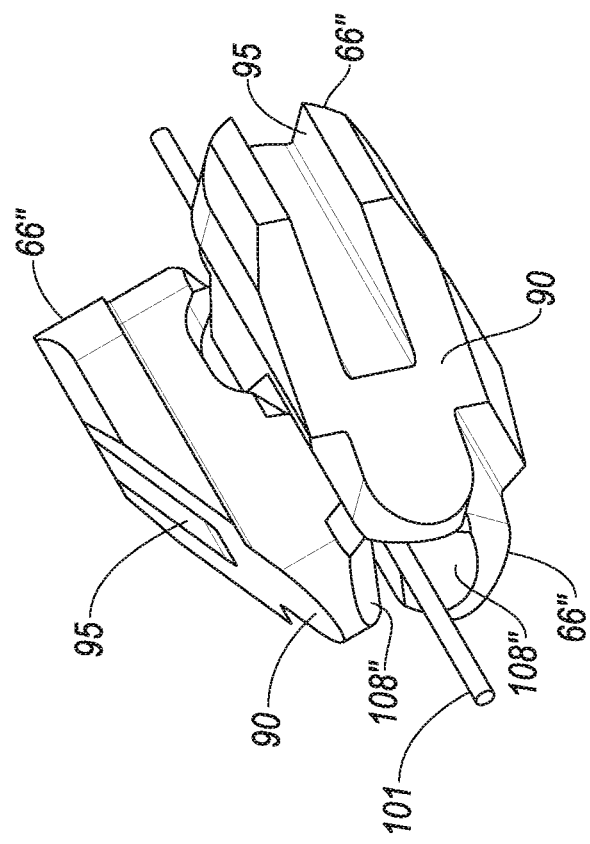
FIG. 12A is a top-left-rear perspective view of three of the chuck jaws of FIG. 11A in a pre-clamping position relative to an example small-diameter shaft.
Figure 12C:
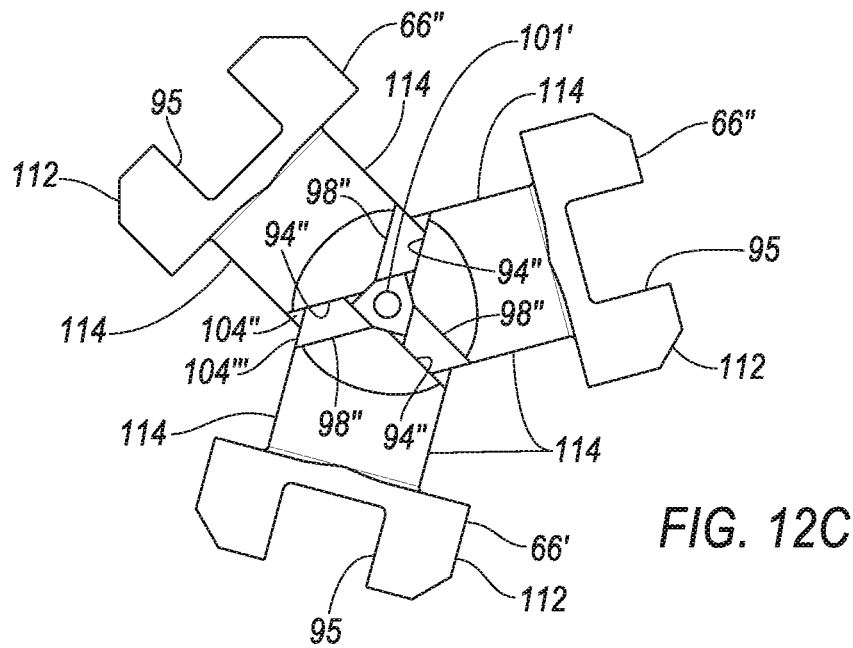
FIG. 12C is a front view of the chuck jaws of FIG. 12A in the pre-clamping position relative to the example small-diameter shaft.
Figure 12D:
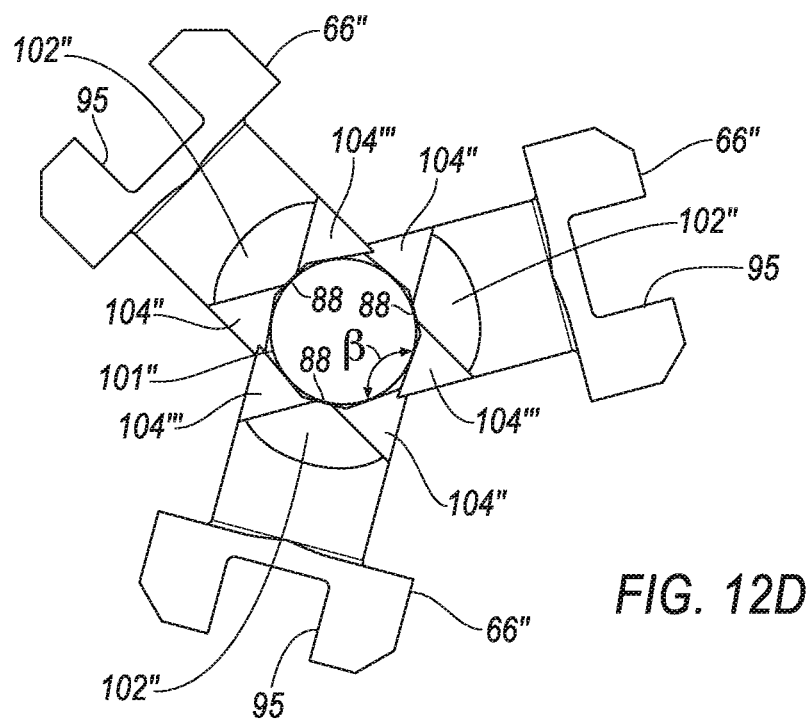
FIG. 12D is a front view of the chuck jaws of FIG. 12A in a clamping position relative to an example large-diameter shaft.

The lateral sides 94, 98 of the jaws 66 may be separated by an angle $\alpha$ substantially equal to 360° divided by the number of jaws. In the present example, with three jaws 66, the angle $\alpha$ may be substantially equal to 120°. Chucks having a larger number of jaws will have a proportionately lower value for the angle $\alpha$. Facing lateral sides 94, 98 of adjacent jaws 66 may be substantially parallel to each other, i.e., at an angle of 0° to each other. A shaft 101 disposed between facing lateral side 94, 98 might be pinched between two adjacent jaws 66. However, the protrusion 92, as shown in FIGS. 8C and 8D, provides an angle $\beta$ between a facing surface 100 of the protrusions 92 and the facing lateral sides 98 relative to the angle $\beta$ between the facing sides 94, 98. The increase in the angle $\beta$ may cause a shaft 101, e.g., a wire, a pin, a tool bit, disposed between the surface 100 and the side 98, to be pushed toward the axis 24 as the surface 100 and the side 98 move closer together, rather than being pinched.

The example of FIGS. 8C and 8D shows the angle $\beta$ being increased from 0°, without the protrusion 92, to 30° with the introduction of the protrusion 92. The protrusion 92 of each jaw 66 is disposed at least in part in the cavity 96 of an adjacent jaw 66 in at least one position of the chuck 20, such a position being illustrated in FIG. 8C so that the jaws 66 are interleaving. The protrusion 92 of each jaw 66 may be substantially complementary to the cavity 96 in the adjacent jaw 66.

The inclined engagement surface 84 of the engagement sleeve 80 is substantially centered about the axis 24 and is substantially parallel to the driving surface 90. The engagement surface 84 may include a plurality of circumferentially distributed engagement segments. Displacement of the jaws 66 relative to the inclined engagement surface 84 in a clamping direction displaces the clamping surfaces 88 toward the axis 24. The clamping direction for the surface 84 and the jaws 66 is consistent with movement of the engagement surface 84 towards the jaws 66, e.g., with the sleeve 80 moving in a leftward direction relative to the housing 36 in FIGS. 5A-5C with clamping, with the jaw guide 64 remaining laterally stationary relative to the housing 36.

The jaws 66 and the protrusions 92 may each have a sloped distal entry surface, 102 and 104 respectively, to receive a shaft 101 from a distal end of the chuck 20 and the handpiece 22. The sloped distal surfaces 102, 104 may taper in a proximal direction toward the axis 24 in an installed condition. Such sloped distal surfaces 102, 104 may aid in directing an end of the shaft 101 that comes into engagement with the sloped surfaces 102, 104 to slide both axially and radially further along the surfaces 102, 104 and into a receiving aperture 106 between the jaws 66. As the jaws 66 move together, the shaft 101 is moved to a clamping position within the aperture 106 between the clamping surfaces 88 of the jaws 66. The jaws 66 are able to receive a small diameter shaft 101', i.e., a shaft 101 of a diameter at a small diameter end of a clamping range of the chuck 20, when the protrusions 92 are disposed at least in part in the cavities 96 in the adjacent jaws 66.

The jaws 66 and the protrusions 92 may each similarly have a sloped proximal entry surface, 108 and 110 respectively, to receive a shaft 101 from a proximal end of the handpiece 22 and the chuck 20. The sloped proximal surfaces 108, 110 may taper in a distal direction toward the axis 24 in an installed condition. Such sloped proximal surfaces 108, 110 may aid in directing an end of the shaft 101 that comes into engagement with the sloped surfaces 108, 110 to slide both axially and radially further along the surfaces 108, 110 and into the receiving aperture 106 between the jaws 66. As the jaws 66 move together, the shaft 101 is moved to a clamping position within the aperture 106 between the clamping surfaces 88 of the jaws 66.

The jaws 66 may also include a flange portion 112 opposite the clamping surface 88 that may incorporate in part the driving surface 90. The flange portion 112 of each jaw 66 may extend laterally beyond side walls 114 of the jaws 66 that are slidably disposed within walls of the channels 65. Engagement of a lower side of the flange portion 112 with the jaw guide 64 may prevent the jaws 66 from over-travel within the channels 65, and may prevent the clamping surfaces 88 from moving past the axis 24.

The jaws 66 may have alternative configurations of protrusions 92 and cavities 96. An alternative example configuration jaw 66' is illustrated in FIGS. 9A-C and 10A-D. A protrusion 92' may extend from a first lateral side 94' at an outboard edge, beyond the clamping surface 88, to define a facing surface 100'. An angle β' between the facing surface 100' and a second lateral side 98' may be 60°. The protrusion 92' may be received at least in part by a complementary cavity 96'. The jaws 66' and the protrusions 92' may each have a sloped distal entry surface, 102' and 104' respectively. The jaws 66' and the protrusions 92' may each similarly have a sloped proximal entry surface, 108' and 110' respectively. The jaws 66' may collectively define a receiving aperture 106'.

Another alternative configuration of a jaw 66", illustrated in FIGS. 11A-C and 12A-D, may have a first protrusion 92" and a first cavity 96" on a first lateral side 94", and a second protrusion 92'" and a second cavity 96'" on a second lateral side 98". An angle β" between the facing surfaces 100", 100'" may be 120°. The jaws 66" and the protrusions 92" may each have a sloped distal entry surface, 102" and 104" respectively. The protrusions 92'" may have a sloped distal entry surface and 104'". The jaws 66" and the protrusions 92" may each similarly have a sloped proximal entry surface, 108" and 110" respectively. The protrusions 92'" may have a sloped proximal entry surface 110'". The jaws 66" may collectively define a receiving aperture 106".

Figure 5C:
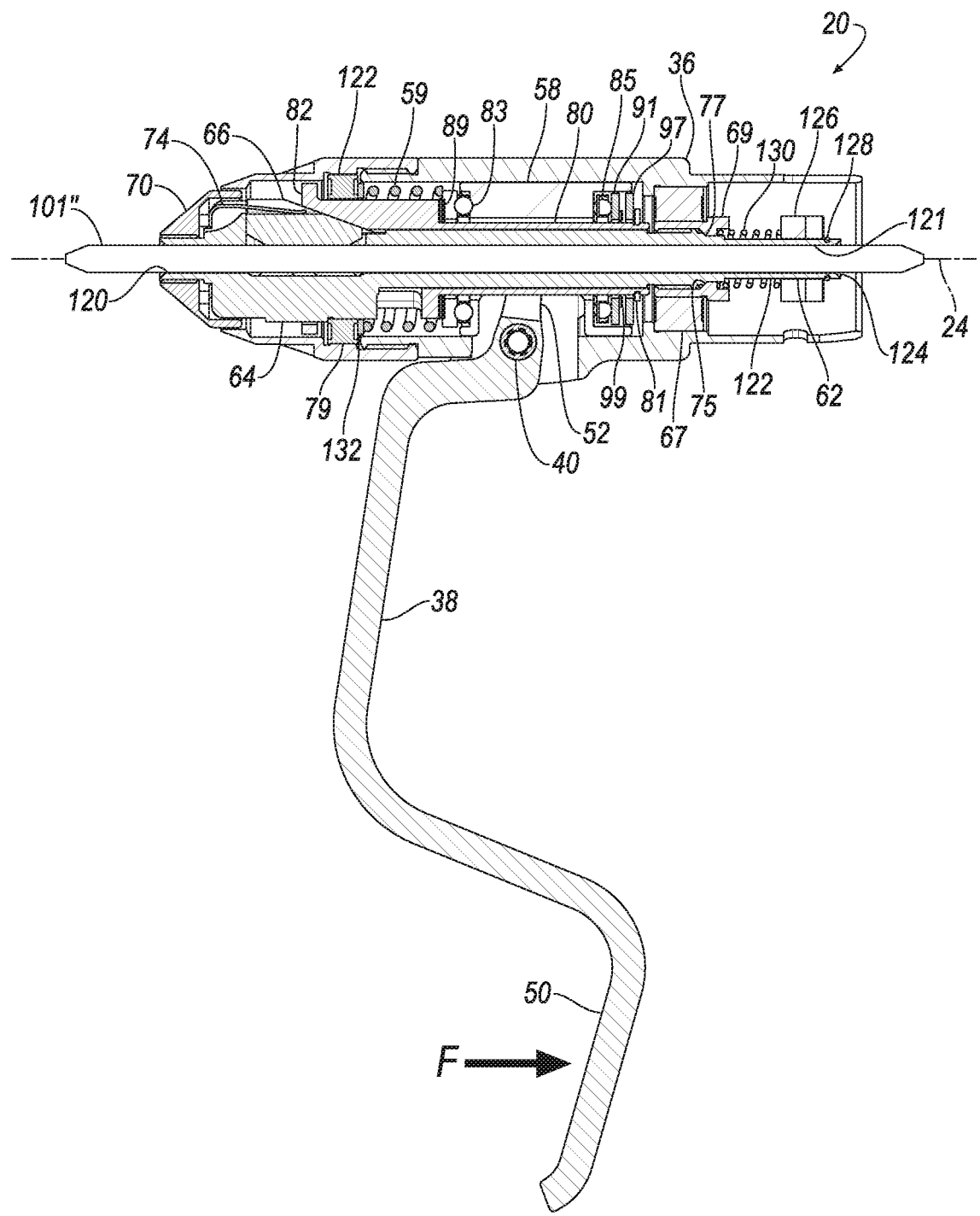
FIG. 5C is the sectional view of the chuck of FIG. 5A with a second shaft therein.
Figure 6:
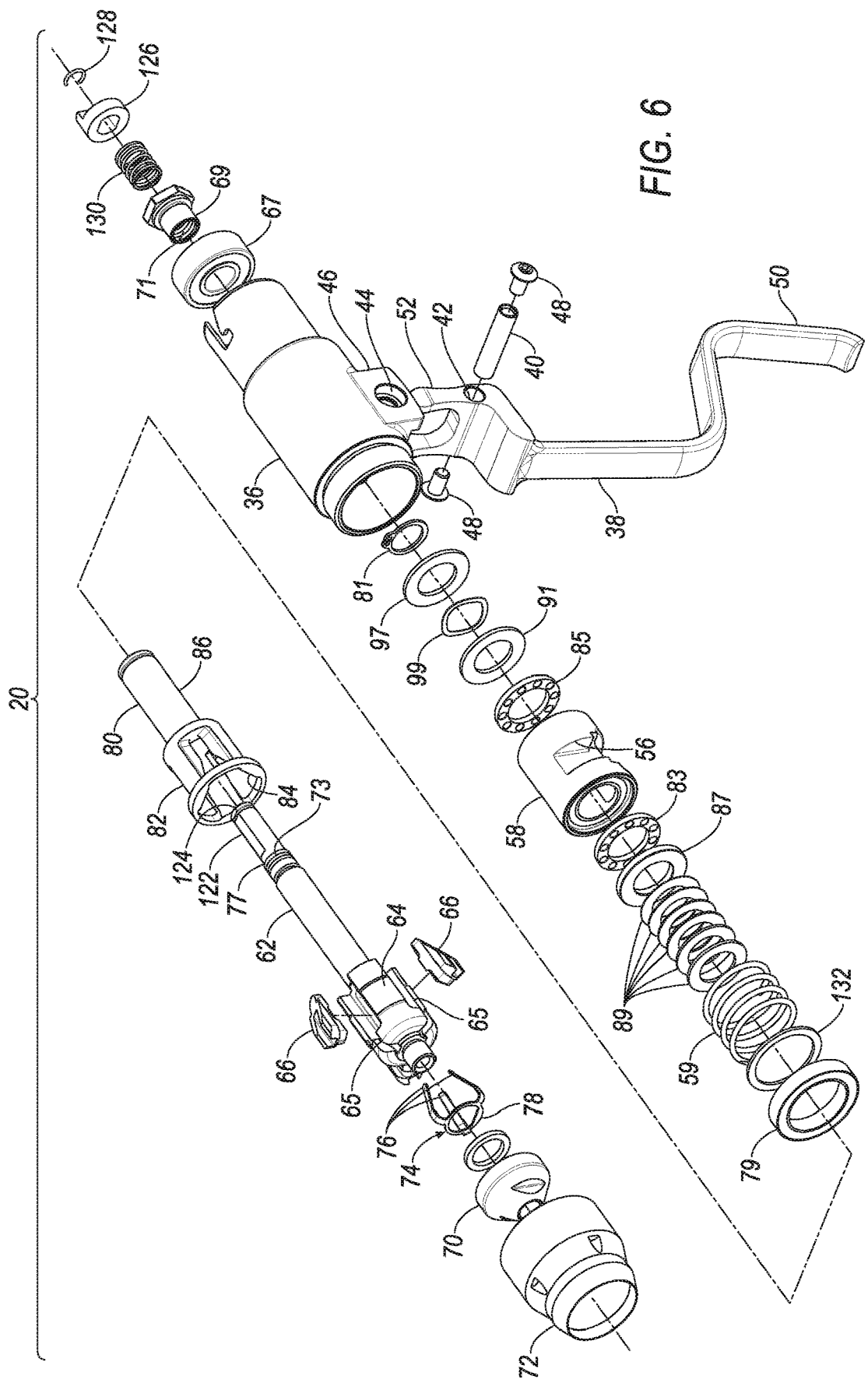
FIG. 6 is an exploded view of the chuck of FIGS. 1-5C.
Figure 7A:
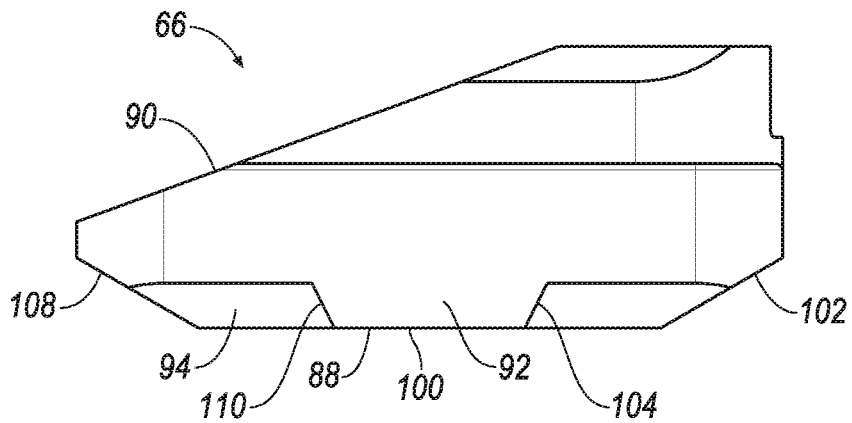
FIG. 7A is a left-side view of a first example chuck jaw of the chuck of FIGS. 1-6.
Figure 7B:
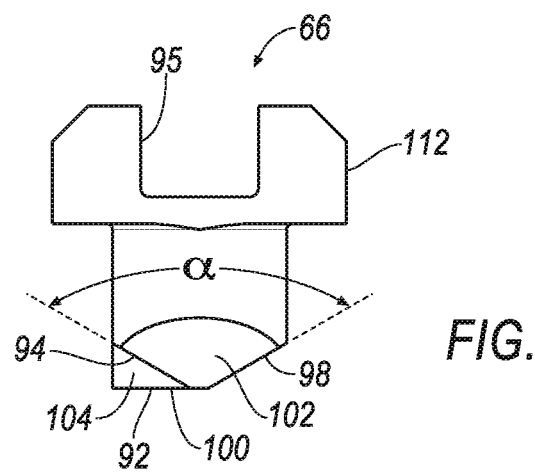
FIG. 7B is a front view of the chuck jaw of FIG. 7A.
Figure 7C:
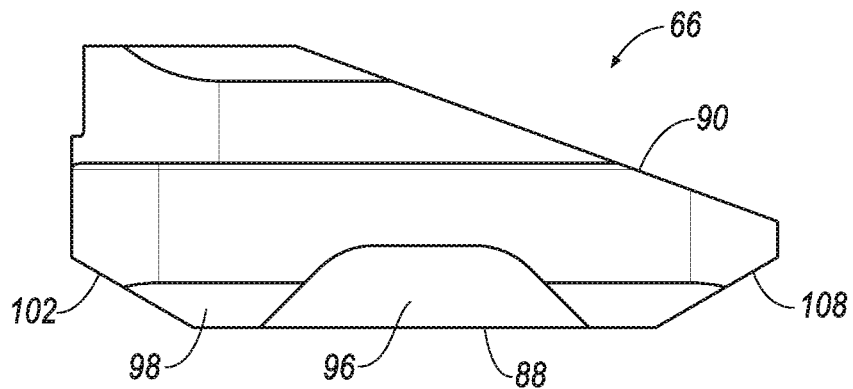
FIG. 7C is a right-side view of the chuck jaw of FIG. 7A.

The chuck 20 may be used in the following manner. The chuck 20 may be installed on the handpiece 22 in a known manner, drivingly connecting the drive shaft 62 with the motor 26. The chuck 20 as illustrated in FIG. 5A is in a disengaged, i.e., released, position. The chuck 20 as illustrated in FIG. 5B is in an engaged or clamped condition, in receipt of the small diameter shaft 101'. The chuck 20 as illustrated in FIG. 5C is also in the engaged or clamped condition, in receipt of a large diameter shaft 101", i.e., a shaft 101 of a diameter at a large diameter end of the clamping range of the chuck 20. An example clamping range may be from 0.5 mm to 3.5 mm, yielding a ratio of largest to smallest of 7:1. An alternative example range of 0.5 mm to 2.0 mm would yield a ratio of 4:1. The clamping of the shaft 101' in FIG. 5B and the shaft 101" in FIG. 5C is responsive to an application of a force F against the grip portion 50, biasing the grip portion 50 towards the grip handle 60 is moved towards the grip handle 60.

The shaft 101, 101', 101" may be inserted into the chuck 20 by passing it through the one of a rear entry aperture 116 in a rear 118 of the housing 36 as shown in FIG. 2, and a front entry aperture 120 through the nose cap 70 as shown in FIG. 1. If through the front entry aperture 120, the shaft 101 may engage the distal entry surface 102, 102', 102" of one of the jaws 66, 66', 66" or the distal entry surface 104, 104', 104", 104'" of one of the protrusions 92. If through the rear entry aperture 116, the shaft 101 may engage the proximal entry surface 108 of one of the jaws 66, 66', 66", or the proximal entry surface 110, 110', 110", 110'" of one of the protrusions. To accommodate entry of the shaft 101, 101', 101" from the rear, the drive shaft 62 may include a drive shaft passage 121 therethrough, coaxial with the axis 24. A diameter of the passage 121 may serve as a limit on a maximum permissible diameter of the shaft 101, 101', 101" that may be received by the chuck 20.

An end of the shaft 101, 101', 101" is directed by the entry surfaces, 102, 102', 102" and 104, 104', 104", 104'" on the distal end, or 108 and 110, 110', 110", 110'" on the proximal end, toward the axis 24. The lever 38 may be gripped on its grip portion 50 by an operator's, i.e., a surgeon's, fingers and the lever 38 squeezed towards the grip handle 60. The lever 38 pivots about the pivot axle 40. The yoke portion 52 tips in a distal direction and, by way of the engagement of the yoke portion 52 with the actuator sleeve 58 at the slot 56, displaces the actuator sleeve 58 in the distal direction as well. The second positioning bearing 79 may be axially restrained on a distal side. An annular reaction plate 132 may be disposed on a proximal side of the second positioning bearing 79 for engagement by the release spring 59. The release spring 59 may be compressed between the first thrust plate and the reaction plate 132. The release spring 59 resists displacement of the sleeve 58 in the distal direction. The actuator sleeve 58 is also in axial engagement, i.e., axially connected, through the first thrust bearing 83, the thrust plate 87 and the shim washers 89, with the head portion 82 of the engagement sleeve 80. The lever 38 may thus be connected to the engagement sleeve 80. Squeezing the lever 38 may cause the inclined engagement surface 84 of the engagement sleeve 80 to engage the driving surfaces 90 of the jaws 66 and displace the jaws 66, 66', 66" and the clamping surfaces 88 toward the axis 24.

Describing the displacement of the jaws 66, 66', 66" in more detail, axial displacement of the sleeve 58 in the distal direction yields axial displacement of the head portion 82 and the entire engagement sleeve 80 and the first thrust bearing 83 in the distal direction. Distal axial displacement of the head portion 82 along the axis 24 causes the inclined surface 84 of the engagement sleeve 80 to act against the driving surfaces 90 of the jaws 66, 66', 66". The jaws 66, 66', 66" are restricted to radial movement, i.e., movement toward and away from the axis 24, by the jaw channels 65 responsive to the force of the head portion 82 against the jaws 66, 66', 66". Thus, axial movement of the sleeve 80 results in a sliding of the inclined surface 84 across the driving surface 90, and radial displacement of the jaws 66, 66', 66' toward the axis 24, such displacement being limited by engagement of the clamping surfaces 88 against the shaft 101, 101', 101". As the clamping surfaces 88 move closer together, the lateral sides 98, 98', 98" of the jaws 66 and/or the facing surfaces 100, 100', 100", 100'" of the protrusions 92, 92', 92", 92'" drive the shaft 101 toward the axis 24.

Jaws featuring complementary protrusions and cavities may be incorporated into any other style of chuck that employs jaws. One alternative construction of a chuck for a wire driver may have a lever connected to a jaw guide adapted for axial movement, not illustrated here, is illustrated in patent publication PCT/US2017/062754. The jaw guide and the jaws disposed therein may be axially displaced by squeezing the lever. The axial displacement of the jaw guide may press the driving surfaces of the jaws against the inclined engagement surface of the engagement sleeve, resultingly displacing the clamping surfaces of the jaws toward the axis. Other example alternative configurations are illustrated in FIGS. 13 through 19C.

Figure 13A:
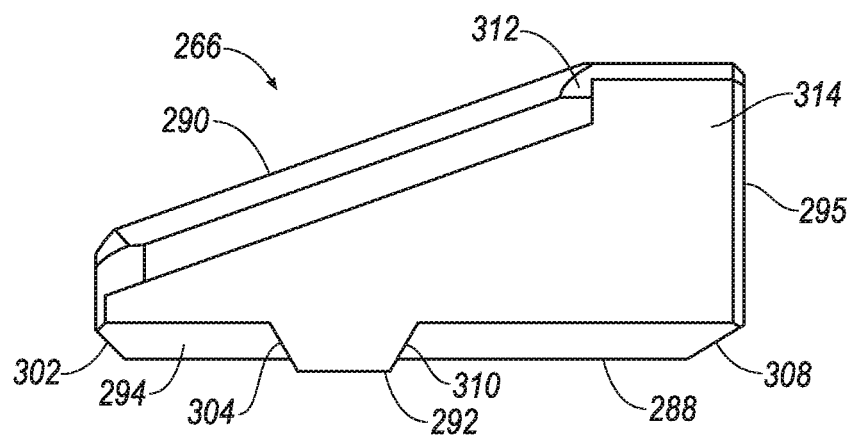
FIG. 13A is a right-side view of a second example chuck jaw of the chuck of FIGS. 14 and 15.
Figure 13B:
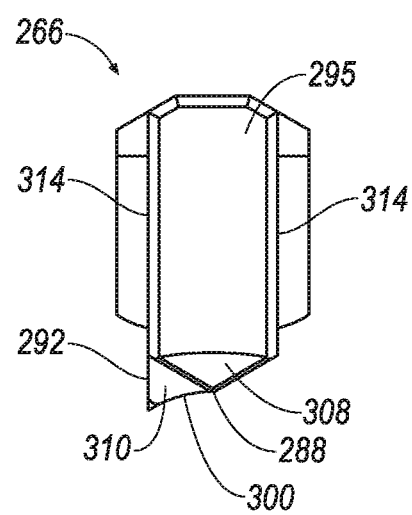
FIG. 13B is a rear view of the chuck jaw of FIG. 13A.
Figure 13C:
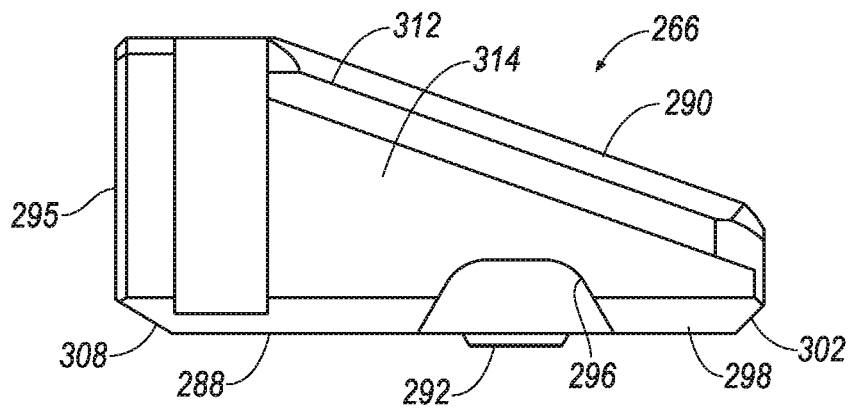
FIG. 13C is a left-side view of the chuck jaw of FIG. 13A.
Figure 14:
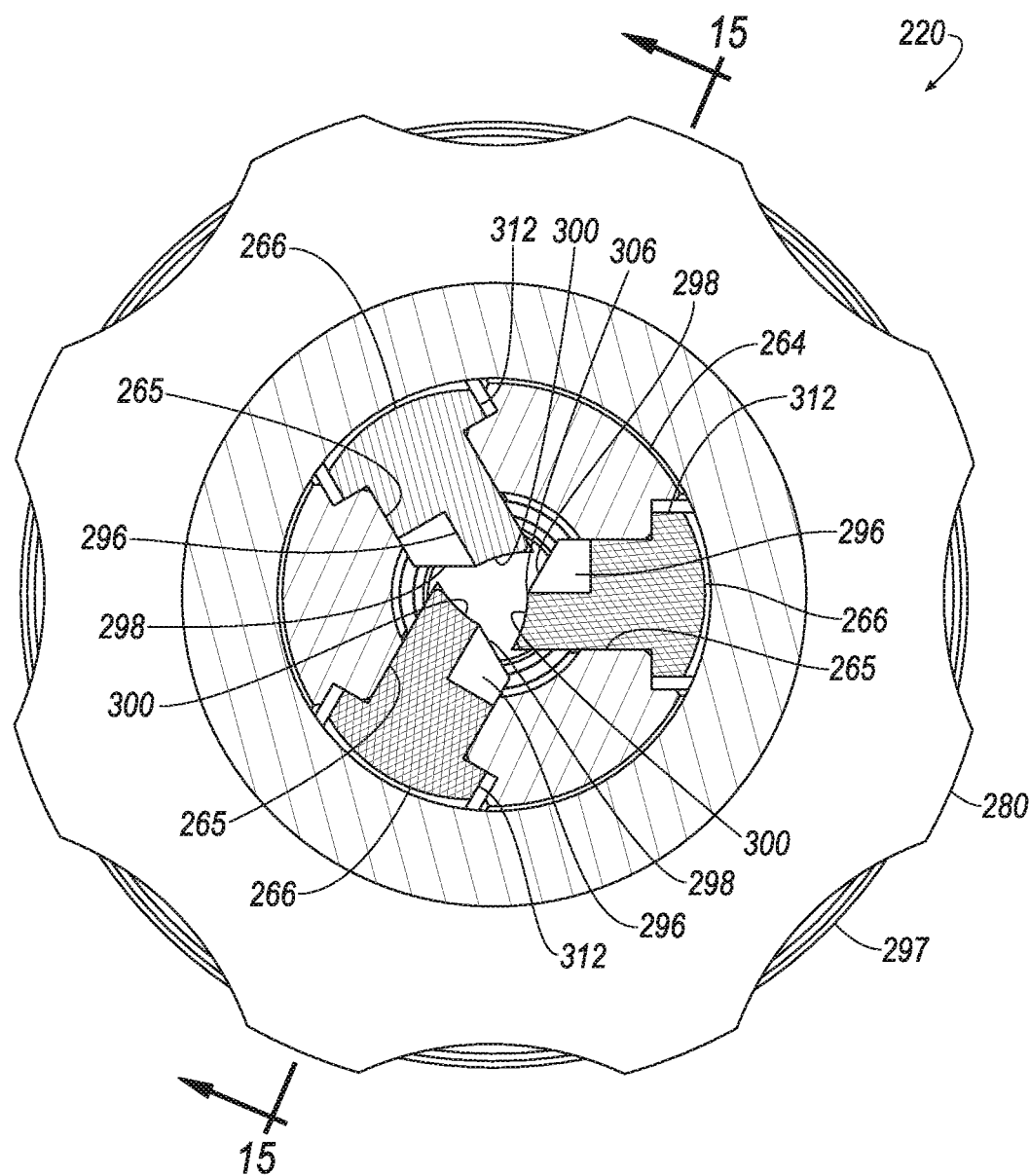
FIG. 14 is a sectional view of a first alternative chuck configuration taken in the direction of arrows 14 of FIG. 15.
Figure 15:
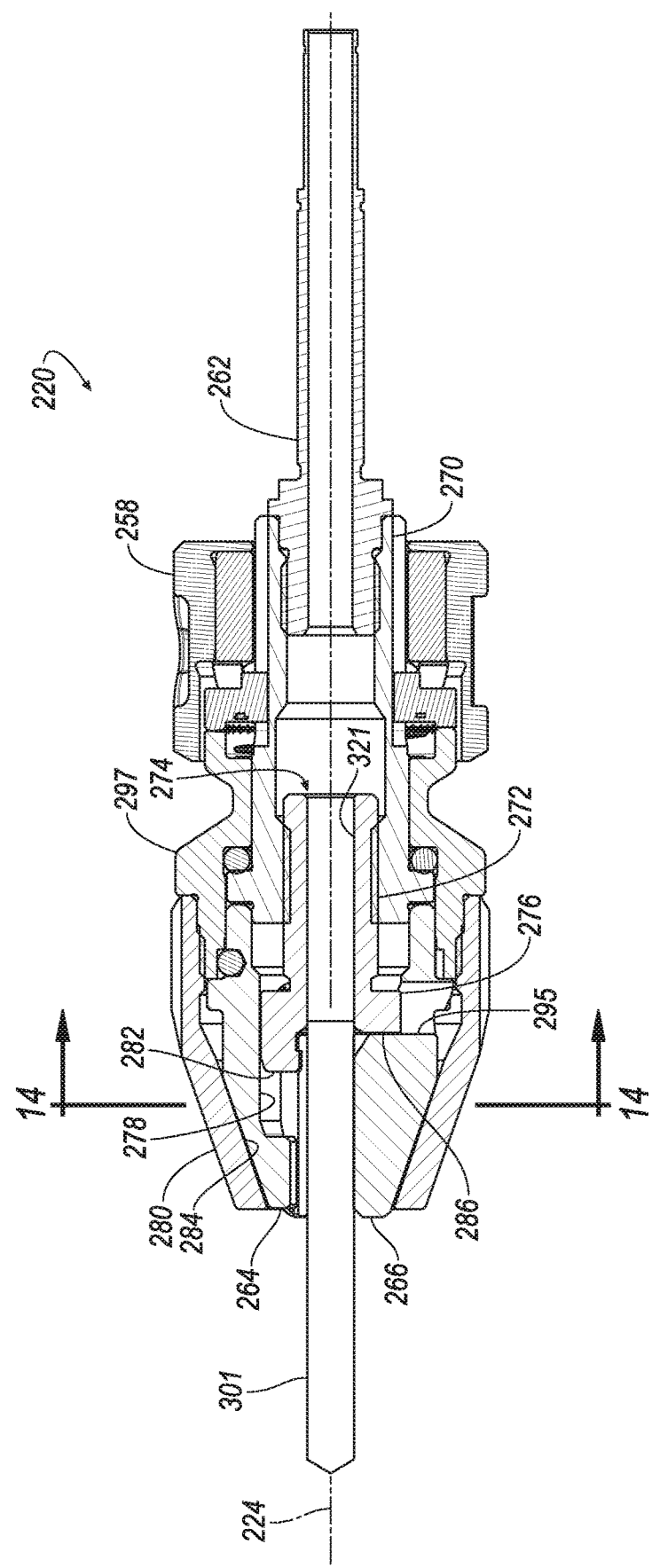
FIG. 15 is a sectional view of the chuck of FIG. 14 taken in the direction of arrows 15.
Figure 16:
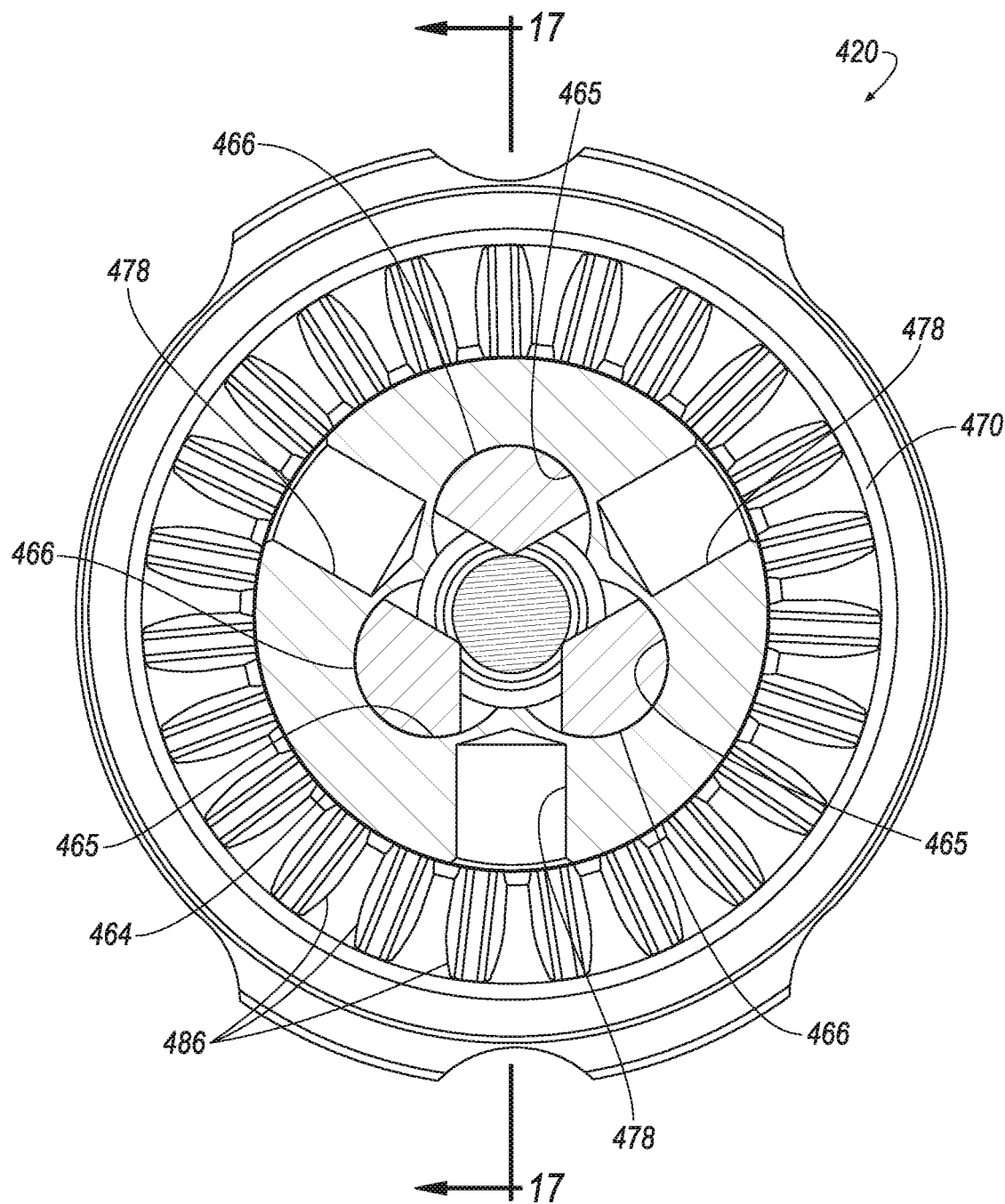
FIG. 16 is a sectional view of a second alternative chuck configuration taken in the direction of arrows 16 of FIG. 17.

FIGS. 13A, B and C illustrate example interleaving jaws 266 for use with an example keyless chuck 220 illustrated in FIGS. 14 and 15. Keyless chucks are commercially available, with an example chuck available as part of a Stryker® System8 power tool set. The example keyless chuck 220 clamps a shaft 301 disposed on a longitudinal axis 224 without the use of a lever like the lever 38 of the chuck 20. Instead, clamping may be achieved by stalling an exterior engagement sleeve 280 by gripping the sleeve 280 with one's hand while using a handpiece like the handpiece 22 to rotate a drive shaft 262 in a tightening direction. Clamping may also be achieved by manually gripping both the sleeve 280 and a collar 258 and rotating the collar 258 and the sleeve 280 relative to each other in the tightening direction.

An axially extending jaw guide 264, defining and centered on the longitudinal axis 224 that also serves as an axis of rotation, slidably retains jaws 266 in jaw channels 265 formed therein. The jaws 266 have a clamping surface 288 facing the axis 224, and a driving surface 290 substantially opposite the clamping surface 288. The jaws 266 each have a protrusion 292 on a first lateral side 294 and a cavity 296 on a second lateral side 298. As illustrated for jaws 66, 66' and 66", adjacent jaws 266 have the protrusion 292 of one jaw 266 disposed in the cavity 296 of another jaw 266 when the jaws 266 are sufficiently radially close to the axis 224.

Like the jaws 66 and the protrusions 92, the jaws 266 and the protrusions 292 may each have a sloped distal entry surface, 302 and 304 respectively, to facilitate receipt of the shaft 301 from a distal end of the chuck 20 and the handpiece 22. Similarly, the jaws 266 and the protrusions 292 may each have a sloped proximal entry surface, 308 and 310 respectively, to receive the shaft 301 from a proximal end of the handpiece 22 and the chuck 220.

Such sloped distal surfaces 302, 304 may aid in directing an end of the shaft 301 that comes into engagement with the sloped surfaces 302, 304 to slide both axially and radially further along the surfaces 302, 304 and into a receiving aperture 306 between the jaws 266. The aperture 306 may be defined at least in part by a facing surface 300 of the protrusions 292 and the second lateral sides 298 of the jaws 266. As the jaws 266 move together, the shaft 301 is moved to a clamping position within the aperture 306 between the clamping surfaces 288 of the jaws 266.

To accommodate entry of the shaft 301, the jaw driver 274 may include a driver passage 321 therethrough, coaxial with the axis 224. A diameter of the passage 321 may serve as a limit on a maximum permissible diameter of the shaft 301 that may be received by the chuck 220.

The jaws 266 may also include a flange portion 312 opposite the clamping surface 288 that may incorporate in part the driving surface 290. The flange portion 312 of each jaw 266 may extend laterally beyond side walls 314 of the jaws 266 that are slidably disposed within walls of the channels 265. Engagement of a lower side of the flange portion 312 with the jaw guide 264 may prevent the jaws 266 from over-travel within the channels 265, and may prevent the clamping surfaces 288 from moving past the axis 224.

The engagement sleeve 280 includes an inclined engagement surface 284 thereon, i.e., therein. The inclined engagement surface 284 is disposed at least in part radially outside of the jaws 266, at least partially enclosing the jaws 266 in an engaged position as best shown in FIG. 15. The engagement surface 284 is substantially centered about the axis 224 and is substantially parallel to the driving surface 290. The axially extending jaw guide 264 may be substantially fixed relative to the engagement sleeve 280. The engagement sleeve 280 may be fixedly coupled to a supplemental sleeve 297.

The drive shaft 262 may be fixed to a driving sleeve 270 for unitary rotation therewith about the axis 224. The driving sleeve 270 may be in threaded engagement with a shank portion 272 of a jaw driver 274. The jaw driver 274 includes an axially displaceable actuation head 276 that is rotatably fixed to, but slidably disposed in the jaw guide 264. Such a relationship may be achieved by providing a plurality of circumferentially distributed finger slots 278 in the jaw guide 264 and an equal number of axially extending engagement fingers 282 on the head 276. The finger slots 278 may be aligned with and connected with and open to the jaw channels 265. A plurality of distal abutment surfaces 286, equal in number to the number of jaws 266, may be disposed on the head 276, circumferentially interposed between the fingers 282. The abutment surfaces 286 may be in engagement with proximal abutment surfaces 295 of the jaws 266 at a proximal end of the jaws 266.

Inward radial movement of the jaws 266 is induced by axial displacement of the head 276 against the jaws 266. More specifically, with relative rotation of the drive shaft 262 in a first direction relative to the engagement sleeve 280, the driving sleeve 270 rotates relative to the jaw driver 274. The threaded engagement between the jaw driver 274 and the driving sleeve 270 results in relative axial displacement between the driver 274 and the sleeve 270 in an engagement direction. The distal abutment surfaces 286 of the jaw driver 274 axially engage and push against the proximal abutment surfaces 295 of the jaws 266, forcing the driving surfaces 290 of the jaws 266 against the inclined surface 284 of the engagement sleeve 280 and axially displacing the jaws 266 in the engagement direction relative to and against the engagement sleeve 280. Movement of the jaws 266 along the axis 224, with the driving surfaces 290 sliding across the inclined surface 284, pushes the clamping surfaces 288 of the jaws 266 against the shaft 301 to clamp the shaft 301.

A Jacobs keyed chuck 420 may also incorporate jaws 466 with complementary protrusions and cavities. Jacobs keyed chucks are commercially available, with an example chuck available as part of a Stryker® System8 power tool set. The example Jacobs keyed chuck 420, shown in FIGS. 16-19C, has three substantially cylindrical jaws 466 slidably disposed in holes, i.e., channels 465, in an axially extending and substantially cylindrical jaw guide 464. The channels 465 may be at an angle γ to a longitudinal axis 424 that may be defined by the jaw guide 464. The longitudinal axis 424 may also serve as an axis of rotation. Rotation of a driving sleeve 470 relative to the jaw guide 464 about the axis 424 in a first relative rotative direction drives the three jaws 466 axially distally, and simultaneously, due to the angle γ, radially inwardly toward the axis 424 for engagement with and clamping of a shaft 501 by clamping surfaces 488 of the jaws 466. Relative rotation between the sleeve 470 and the jaw guide 464 in a second rotative direction, opposite the first rotative direction, drives the jaws 466 both axially proximally toward the handpiece 22, and radially away from the axis 424 and the shaft 501. A chuck key, not shown, may be used to rotate the sleeve 470 relative to the jaw guide 464.

The clamping surface 488 of each of the jaws 466 face the axis 424. A driving surface 490 is located on the jaws 466 substantially opposite the clamping surface 488 at a distal end of the jaws 466. The jaws 466, as illustrated in FIGS. 18A and 18B, may have a first protrusion 492 and a first cavity 496 on a first lateral side 494, and a second protrusion 492' and a second cavity 496' on a second lateral side 498. As illustrated for jaws 66", adjacent jaws 466 may have the protrusion 492, 492' of one jaw 466 disposed in the cavity 496', 496 of another jaw 466 when the jaws 466 are sufficiently radially close to the axis 424. The jaws 466 and the protrusions 492, 492' may each have a sloped distal entry surface 502, 504, and 504' respectively, to facilitate receipt of the shaft 501 from a distal end of the chuck 420 and the handpiece 22.

Such sloped distal surfaces 502, 504, 504' may aid in directing an end of the shaft 501 that comes into engagement with the sloped surfaces 502, 504, 504' to slide both axially and radially further along the surfaces 502, 504, 504' and into a receiving aperture 506 between the jaws 466. The aperture 506 may be defined at least in part by facing surfaces 500, 500' of the protrusions 492, 492' and the clamping surfaces 488. As the jaws 466 move together, the shaft 501 is moved by the facing surfaces 500, 500' to a clamping position within the aperture 506 between the clamping surfaces 488 of the jaws 466.

To accommodate entry of the shaft 501 into the jaw guide 464 proximally beyond the jaws 466, the jaw guide 464 may include a guide passage 521 therethrough, coaxial with the axis 424. A diameter of the passage 521 may serve as a limit on a maximum permissible diameter of the shaft 501 that may be received by the chuck 420.

Figure 17:
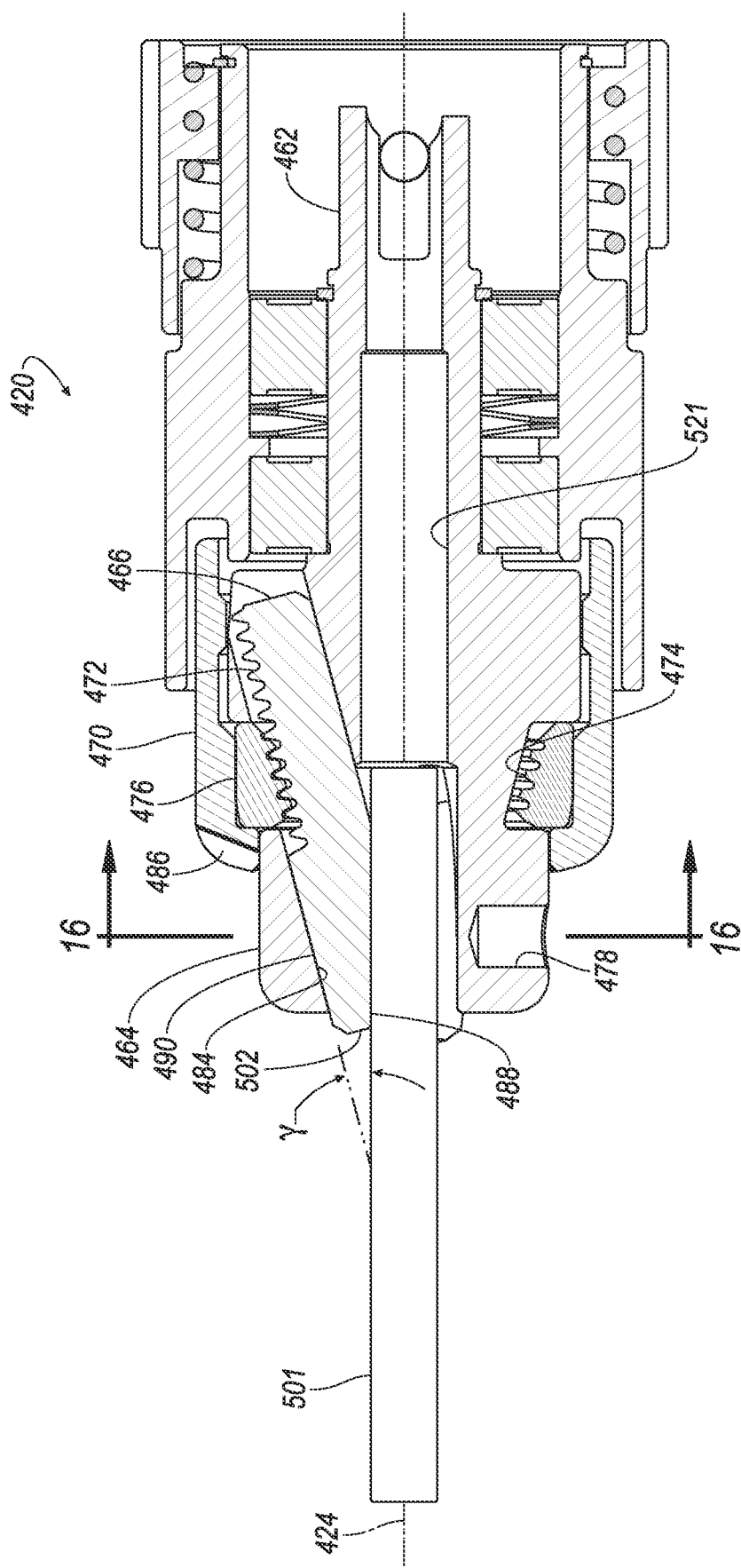
FIG. 17 is a sectional view of the chuck of FIG. 16 taken in the direction of arrows 17.

The jaw guide 464 includes an example inclined engagement surface 484 therein collectively disposed in the channels 465, opposite the axis 424. The inclined engagement surface 484 is disposed at least in part radially outside of its associated jaw 466, at least partially enclosing the jaws 466 in an engaged position as best shown in FIG. 17. The inclined engagement surface 484 is substantially centered about the axis 424 and is substantially parallel to the driving surface 490 of the associated jaw 466.

The jaw guide 464 may include an axially extending drive shaft 462 for unitary rotation therewith about the axis 424.

The drive shaft 462 may be selectively engaged with the handpiece 22. The driving sleeve 470 may drive, i.e., axially displace, the jaws 466 through a threaded connection therebetween. An outward facing threaded surface 472 of each jaw 466 on a side opposite the axis 424, and at a proximal end of the jaws 466, may be engaged by providing inner, i.e., female threads 474 within the driving sleeve 470. The sleeve 470 may include a split nut 476 disposed over the jaws and pressed into the sleeve 470. The sleeve 470 has a circle of chuck sleeve teeth 486 distributed on a distal end of the sleeve 470 centered on the axis 424, and a plurality of, e.g., three, pin holes 478 in the jaw guide 464 distally beyond the sleeve 470. The chuck key (not shown) may include a pin surrounded by chuck key teeth.

Figure 19A:
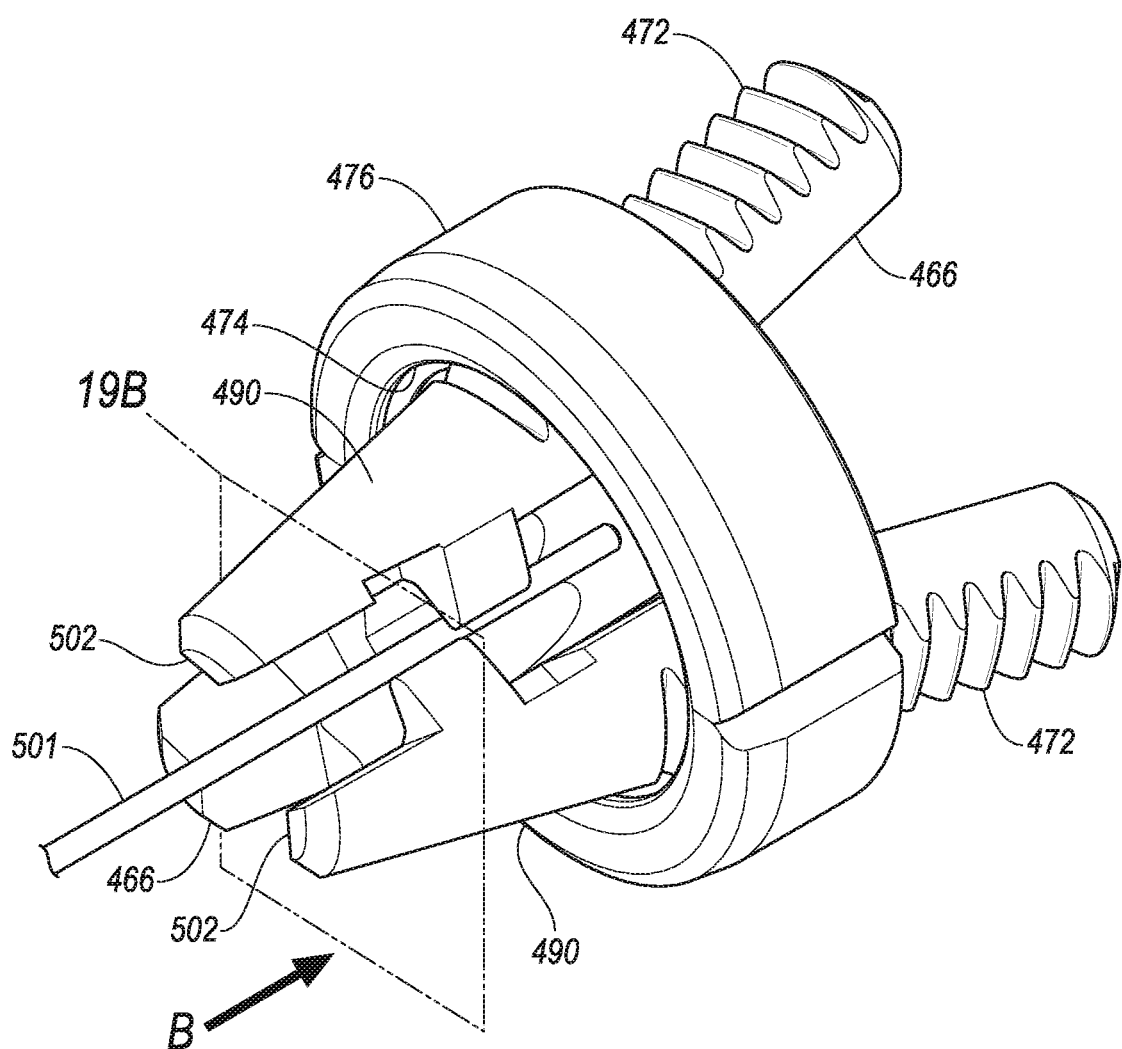
FIG. 19A is a top-right-front perspective view of a split nut and jaws of the chuck of FIG. 16 in an open condition with a small diameter wire disposed therein.
Figure 19B:
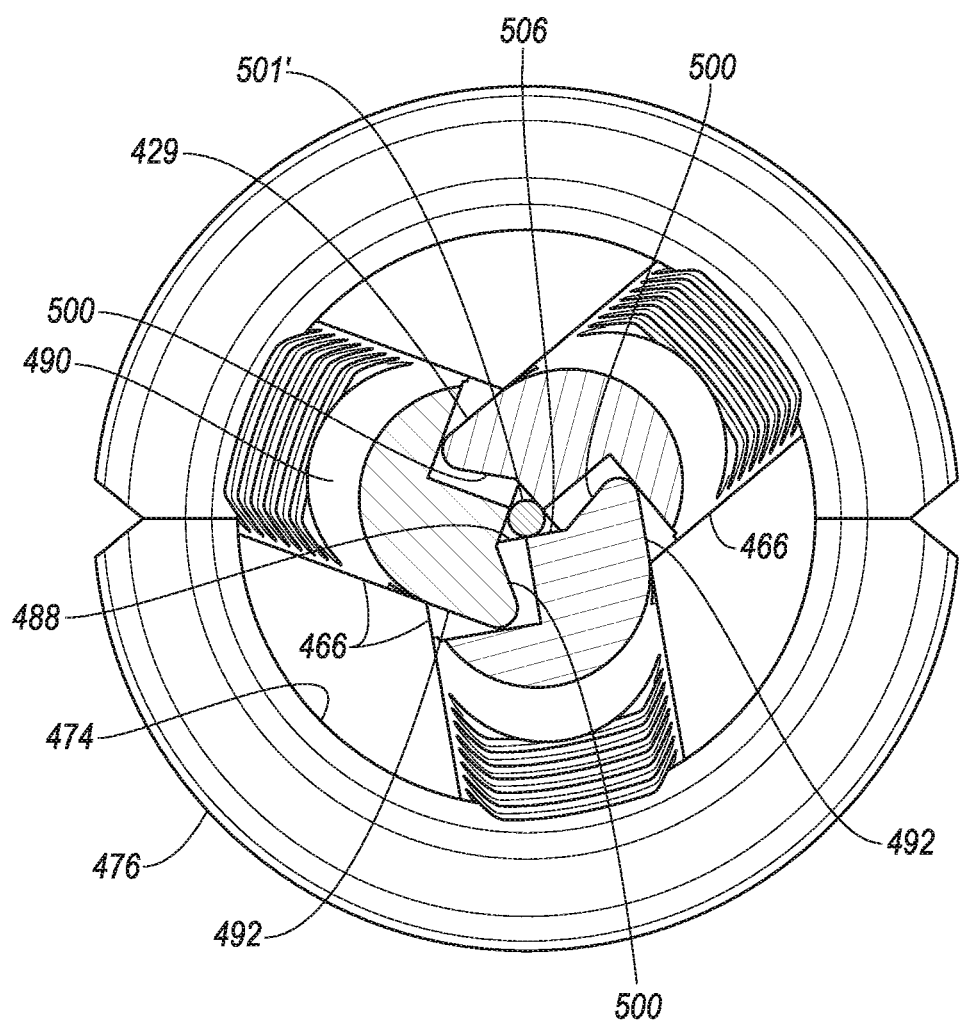
FIG. 19B is a front sectional view of the split nut and jaws of FIG. 19A through a plane 19B in a clamped condition with a small diameter wire disposed therein.
Figure 19C:
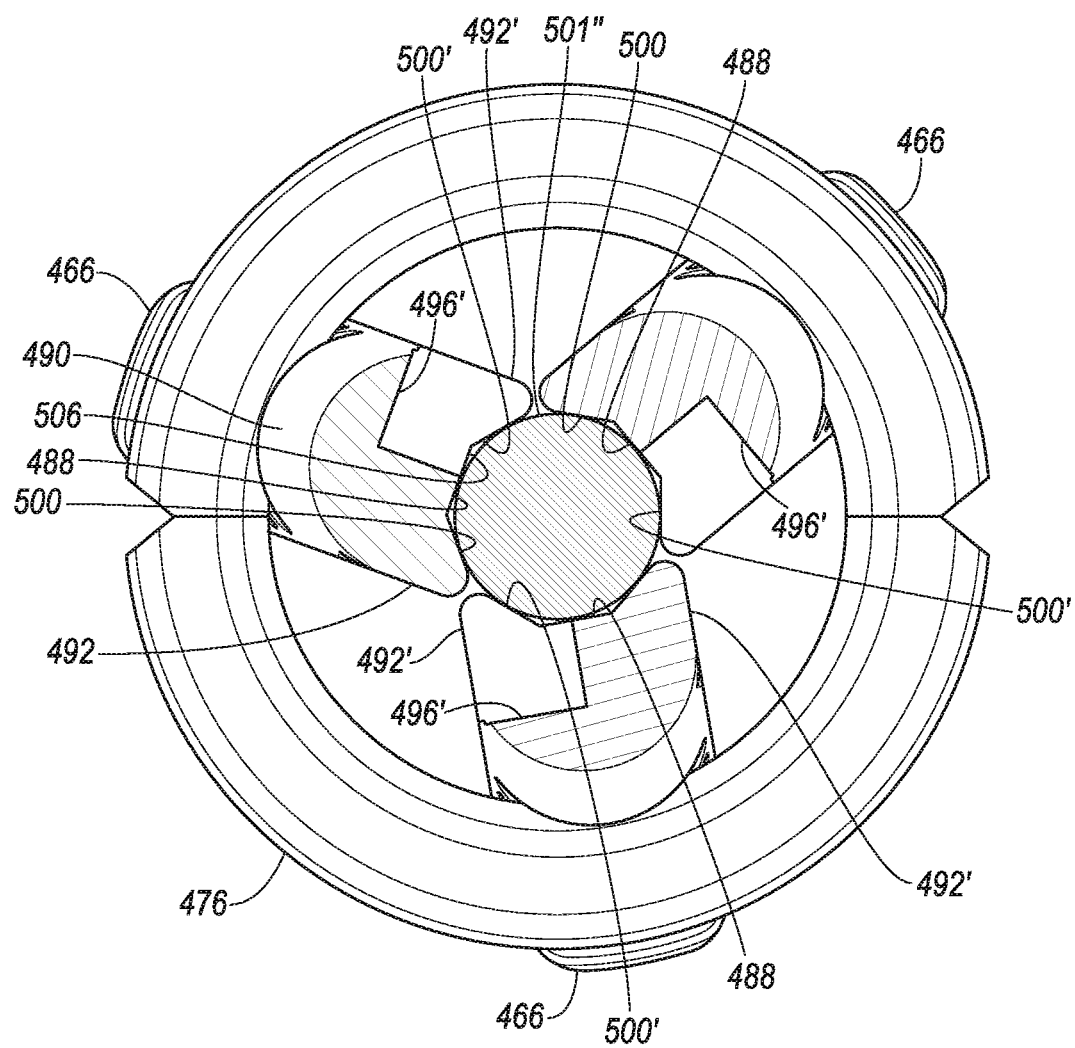
FIG. 19C is a front sectional view of the split nut and jaws of FIG. 19A through the plane 19B in a clamped condition with a large-diameter wire disposed therein.

As with the chucks 20 and 220, inward radial movement of the jaws 466 of the chuck 420 is induced, as when clamping the shaft 501, by relative axial displacement of the jaws 466 relative to the inclined surface 484 engaged by the driving surfaces 490 of the jaws 466. Such relative axial displacement may be provided with use of the chuck key. The chuck key is engaged with the chuck when the pin of the key is disposed in one of the pin holes 478 and the teeth of the key are meshed with the chuck sleeve teeth 486. Once engaged, the key is rotated in a tightening direction, thereby rotating the sleeve 470 relative to the jaw guide 464 in a first, i.e., tightening, direction. Rotation of the sleeve 470 relative to the jaw guide 464 may also be achieved manually by engaging the sleeve with one's fingers while using the handpiece 22 to rotate the jaw guide 464. Rotation of the collar 258 may rotate the drive shaft 262 therewith. Such manual clamping may be following by using the key to tighten the jaws 466 against the shaft 501. With rotation of the sleeve 470 and the nut 476 therewith relative to the jaw guide 464 in the first direction, the jaws 466 are driven axially distally by the action of the nut threads 474 on the threaded surfaces 472 of the jaws 466. The threaded engagement between the jaws 466 and the driving sleeve 470 results in relative axial displacement between the guide 464 and the sleeve 470. The driving surfaces 490 of the jaws 466, acting against the inclined surface 484 of the jaw guide 464, cause the clamping surfaces 488 of the jaws to move radially inwardly. Movement of the jaws 466 along the axis 424, with the driving surfaces 490 sliding across the inclined surface 484, pushes the clamping surfaces 488 of the jaws 466 against the shaft 501 to clamp the shaft 501. Rotation of the key in the opposite direction releases the shaft 501. FIG. 19B shows the jaws 466 clamped against a small diameter shaft 501'. FIG. 19C shows the jaws 466 clamping a large diameter shaft 501".

A jaw chuck with interleaving jaws has been disclosed.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A chuck for a wire driver, the chuck comprising:
    an axially extending jaw guide defining a longitudinal axis and including a first plurality of jaw channels circumferentially distributed about the axis;
    a plurality of interleaving jaws slidably disposed in the jaw channels and each jaw having a clamping surface facing the axis and a driving surface substantially opposite the clamping surface and a protrusion on a first lateral side and a cavity on a second lateral side with the protrusion of each jaw disposed at least in part in the cavity of an adjacent jaw; and
    an engagement sleeve having an inclined engagement surface on an inner surface thereof, the engagement surface substantially centered about the axis and substantially parallel to the driving surface, wherein displacement of the jaw guide relative to the engagement sleeve in a clamping direction displaces the clamping surfaces toward the axis,
    wherein the plurality of interleaving jaws are restricted to radial movement by the jaw channels such that the plurality of interleaving jaws are restricted to move only in directions toward and away from the axis.

2. A chuck for a wire driver as claimed in claim 1, further comprising:
    a substantially cylindrical housing inside which the jaw guide, the jaws, and the engagement sleeve are rotatably disposed; and
    a clamping lever pivotably mounted to the housing and connected to one of the jaw guide and the engagement sleeve for axial displacement thereof.

3. A chuck as claimed in claim 1, wherein the jaws define a receiving aperture accommodating receipt and clamping of shafts ranging from a first diameter to a larger second diameter with the protrusions being disposed in the cavities when the jaws are positioned to clamp shafts of the first diameter.

4. A chuck as claimed in claim 1, wherein the channels and the jaws are evenly distributed about the axis and the protrusion of each jaw is substantially complementary to the cavity in the adjacent jaw.

5. A chuck as claimed in claim 1, wherein the jaws have each of a protrusion and a cavity on each of the first lateral side and the second lateral side and the protrusion of the first lateral side of each jaw is disposed at least in part in the cavity of the second lateral side of an adjacent jaw, and the protrusion of the second lateral side of each jaw is disposed at least in part in the cavity of the first lateral side of the adjacent jaw.

6. A chuck as claimed in claim 1, wherein the jaws and the protrusions each have a sloped distal surface.

7. A chuck as claimed in claim 1, wherein the jaws and the protrusions each have a sloped proximal surface.

8. A chuck as claimed in claim 1, wherein the jaws and the protrusions each have a sloped distal surface and have a sloped proximal surface.

9. A chuck as claimed in claim 1, wherein the protrusion extends towards the axis beyond the clamping surface.

10. A chuck as claimed in claim 1, wherein a ratio of a largest shaft to a smallest that can be accommodated by the chuck without pinching is at least 4:1.

* * * * *